Dec. 26, 1961 M. PHILIP Re. 25,101

METHOD OF AND APPARATUS FOR CHANGING KNITTING PATTERNS

Original Filed March 30, 1956 15 Sheets-Sheet 1

INVENTOR
Morris Philip
BY
ATTORNEY

METHOD OF AND APPARATUS FOR CHANGING KNITTING PATTERNS

Original Filed March 30, 1956 15 Sheets-Sheet 2

INVENTOR
Morris Philip
BY
ATTORNEY

METHOD OF AND APPARATUS FOR CHANGING KNITTING PATTERNS

Original Filed March 30, 1956 15 Sheets-Sheet 3

INVENTOR
Morris Philip
BY
ATTORNEY

METHOD OF AND APPARATUS FOR CHANGING KNITTING PATTERNS

Original Filed March 30, 1956 15 Sheets-Sheet 4

INVENTOR
BY Morris Philip
ATTORNEY

METHOD OF AND APPARATUS FOR CHANGING KNITTING PATTERNS

Original Filed March 30, 1956 15 Sheets-Sheet 5

INVENTOR
Morris Philip
BY Leon A. Gaskof
ATTORNEY

METHOD OF AND APPARATUS FOR CHANGING KNITTING PATTERNS

Original Filed March 30, 1956 15 Sheets-Sheet 6

INVENTOR
Morris Philip
BY
ATTORNEY

METHOD OF AND APPARATUS FOR CHANGING KNITTING PATTERNS

Original Filed March 30, 1956 15 Sheets-Sheet 7

INVENTOR

*Morris Philip*

BY *Sam P. Lachof*

ATTORNEY

METHOD OF AND APPARATUS FOR CHANGING KNITTING PATTERNS

Original Filed March 30, 1956 15 Sheets-Sheet 8

INVENTOR
BY Morris Philip
ATTORNEY

METHOD OF AND APPARATUS FOR CHANGING KNITTING PATTERNS

Original Filed March 30, 1956 15 Sheets-Sheet 9

INVENTOR
Morris Philip
BY
ATTORNEY

METHOD OF AND APPARATUS FOR CHANGING KNITTING PATTERNS

Original Filed March 30, 1956 15 Sheets-Sheet 10

INVENTOR
BY Morris Philip
ATTORNEY

METHOD OF AND APPARATUS FOR CHANGING KNITTING PATTERNS

Original Filed March 30, 1956 15 Sheets-Sheet 11

INVENTOR

BY Morris Philip

ATTORNEY

METHOD OF AND APPARATUS FOR CHANGING KNITTING PATTERNS

Original Filed March 30, 1956 15 Sheets-Sheet 12

INVENTOR
BY Morris Philip
Sam P. Tachoff
ATTORNEY

METHOD OF AND APPARATUS FOR CHANGING KNITTING PATTERNS

Original Filed March 30, 1956 15 Sheets-Sheet 13

INVENTOR
BY Morris Philip
ATTORNEY

METHOD OF AND APPARATUS FOR CHANGING KNITTING PATTERNS

Original Filed March 30, 1956 15 Sheets-Sheet 14

INVENTOR
*Morris Philip*

BY *Irvin P. Fischof*

ATTORNEY

INVENTOR
Morris Philip
BY
Pennie, Edmonds, Morton, Barrows & Taylor
ATTORNEYS

United States Patent Office

Re. 25,101
Reissued Dec. 26, 1961

25,101
METHOD OF AND APPARATUS FOR CHANGING KNITTING PATTERNS

Morris Philip, New York, N.Y.

Original No. 2,775,880, dated Jan. 1, 1957, Ser. No. 575,267, Mar. 30, 1956. Application for reissue June 25, 1957, Ser. No. 668,592
28 Claims. (Cl. 66—19)

Matter enclosed in heavy brackets [ ] appears in the original patent but forms no part of this reissue specification; matter printed in italics indicates the additions made by reissue.

This invention relates to knitting machinery, and, in particular, to method and apparatus for changing the knitting pattern of a knitting machine, as, for example, from plain knitting to rib knitting, or the reverse, without changing the operating speed of the machine *and the novel fabric produced thereby.*

The rib stitch referred to in this application is intended to mean the rib bottom and rib cuff of a garment. In an interlock knitted garment, for example, one strand of yarn is required in each knitting feed to knit the body fabric, whereas two strands of yarn are required in each knitting feed to knit the rib bottom or cuff. *Interlock knitting is the special form of fabric produced by the machine of Scott U.S. Patent 925,393, illustrated in FIG. 5 thereof, which, as defined in claim 1 thereof, may be regarded as "one ribbed fabric" with "another ribbed fabric interlocked with the first." This special fabric constitutes the body portion of interlock garments and, in this sense, is "plain" knitting in contrast to the "rib stitch," above defined. Such garments with such body construction and such rib and cuff construction are standard articles of commerce at the present time.*

The general object of the invention is to provide novel means for periodically changing the knitting pattern of a multifeed knitting machine which operates to move the yarn of each of certain spaced feeds out of reach of needles immediately opposite said feeds and to transfer the yarn to another feed for delivery thereby, and with its own yarn, to needles immediately opposite that feed, whereby each other feed delivers at least two yarns to its proximate needles, and said certain spaced feeds deliver no yarn to their proximate needles; and then to reverse the process. That the transfer of yarns may take place while the knitting machine is operating at full speed is a particular feature of the invention.

As will be shown subsequently, the present invention is useful in connection with a multifeed knitting machine in which the needle bank (or banks) is stationary and the yarn feeds move, or in which the bank (or banks) moves and the feeds are stationary, and which machine may be of circular or other type. But for the purposes hereof I have selected an embodiment of the invention in the form of apparatus suited for and assumed to be mounted on a circular knitting machine having a stationary bank of cylinder needles and a stationary bank of cooperating dial needles, and a circular series of angularly spaced yarn feeds mounted on a rotating turntable.

Heretofore, knitting machines of this type and, indeed, all multifeed knitting machines, have required complicated speed-changing mechanism, which operates only at the time of a shift in the pattern of knitting. For example, in a circular knitting machine of the type described equipped with the apparatus of the invention, speed changing is unnecessary when shifting from one pattern of knitting to another, and such mechanism is obviated. And, of course, productivity is stepped up in that the machine, in operation, may constantly run at a maximum practicable speed.

A further advantage of a multifeed knitting machine utilizing the invention is that no apparatus comparable to the usual striper is required; and, in consequence, space need not be provided for such apparatus between consecutive yarn feeds. Therefore, in a circular knitting machine, the angular distance between these feeds may be much less than has been practicable in the past, and, accordingly, the number of yarn feeds may be considerably increased. It will be readily understood that an increase in the number of yarn feeds and a constant high operating speed are complementary advantages. *It will also be readily understood that, since the usual striper is a clip and clamp device, a discontinuity in yarn is produced by its operation. That is to say an additional end of yarn must be provided for each striper employed to furnish the second strand knit by each feed which is knitting the rib bottom on prior machines. For example, suppose a twelve feed machine is operated to produce a knitted fabric having a plurality of interlock courses providing a body fabric adjoining a plurality of rib courses providing a bottom or cuff fabric. Since one strand of yarn is required at each feed to knit the body fabric, twelve ends of yarn will be employed for such knitting. As already pointed out, two strands of yarn are required at each feed to produce the rib bottom. If, as heretofore, striper mechanisms are employed to accomplish this change in knitting pattern, an additional end must be supplied for each striper used to supply two yarns to a feed. Thus, if all twelve feeds are to be employed in knitting the rib bottom, twelve additional ends must be provided. Alternatively a lesser number of feeds such as six may advantageously be used for the rib courses and in this instance only six additional ends are required. The striper associated with the six feeds not knitting rib courses cut and clamp to put them out of action. In any event, each striper supplying a feed used during the knitting of the rib courses will operate to cut and clamp one of the two ends being knit from that feed when the change to interlock courses is made. Thus one-half of the ends of yarn making up the two strand rib courses are discontinuous with any end making up an interlock course. In contradistinction to this, it is inherently a characteristic of fabric made according to my invention that the two ends knit by one feed into a rib course both continue into the interlock courses.*

The present apparatus is so simple that a knitter, familiar with a conventional multifeed knitting machine of the type described, would experience no difficulty in operating a machine equipped with such apparatus.

The apparatus of the invention, described herein, is associated with the yarn feeds and with means for automatically adjusting certain spaced feeds, in a predetermined manner. Apparatus embodying the invention is of negligible magnitude compared with a multifeed knitting machine as a whole. Broadly, the application of apparatus embodying the invention to a multifeed knitting machine changes only the yarn feeds themselves, and adds means for adjusting certain feeds and may eliminate speed-changing mechanism and stripers.

The makeready and operation of, say, circular knitting machines of the type described and equipped with the present apparatus calls for practically no additional training on the part of the knitter. However, on account of the high productivity, the frequency of reloading with new cones of yarn, and threading yarns through the usual guides and tensioning devices to the feeds, will be found to be considerably greater than with machines not equipped to utilize the invention.

The addition of the apparatus of the invention to a conventional multifeed knitting machine does not alter the floor space requirement of the machine. Also, on account of the elimination of speed-changing mechanism and stripers, a multifeed knitting machine equipped with the apparatus of the invention is actually less complex than an ordinary conventional machine, and maintenance is less troublesome. Further, tests of conventional multifeed knitting machines equipped with the present apparatus have shown a marked reduction in needle breakage.

The present invention achieves the result of shifting from one knitting pattern to another without changing the operating speed of the knitting machine simply by adjusting certain yarn feeds while, in the case of the circular knitting machine, herein selected as an exemplary multifeed machine, they are rotating around the needle bank or banks at top operating speed. The invention has nothing to do with shifting the order of needle operation.

The apparatus of the invention does, however, provide substitute yarn feeds for those with which the conventional multifeed knitting machine is at present equipped, and also provides means for adjusting certain of the substitute yarn feeds at predetermined times.

Except to the extent suggested by the foregoing, the application of the present apparatus to a conventional multifeed knitting machine does not mechanically change the machine or the manner in which it is operated by the knitter.

The objects, features, and advantages of the invention will be more fully understood from the following detailed description of the apparatus of the invention in a form suited to and mounted on a conventional multifeed circular knitting machine of the type described above, and from the drawing.

In the drawing there is no figure which shows the related circular knitting machine in its entirety, nor is such a figure necessary for those familiar with the art. While the apparatus of the invention is fully illustrated, only a few fragmentary outlines of parts of the related knitting machine are entered in the drawing for purposes of orientation.

FIGS. 1a through 1d are fragmentary top plan views of the knitting machine equipped with the apparatus of the invention, and all views are taken from slightly above the turntable of the machine. If these figures were complete they would actually be horizontal sections of the machine referred to a plane at the level of the views. Each figure shows a fixed yarn feed to the left and an adjustable yarn feed to the right, with both feeds mounted on the turntable; segments of parts of the bank of dial needles and of the bank of cylinder needles, and of the peripheral portions of the machine.

FIGS. 2a through 2d are views directed toward the center of the machine from beyond the periphery thereof.

Figure 1A:
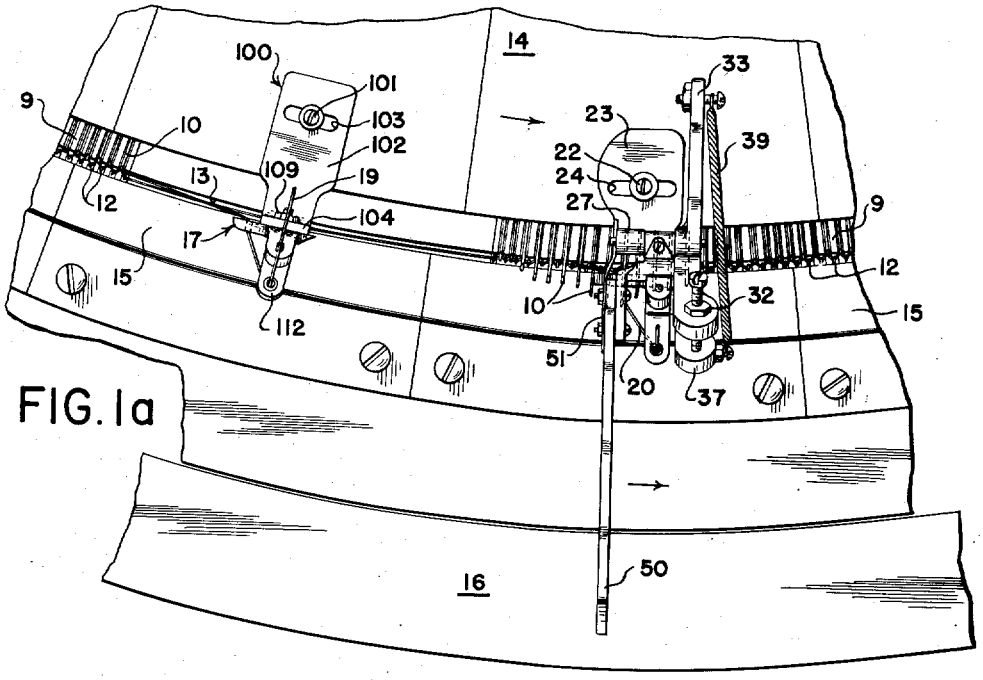
Figure 2A:
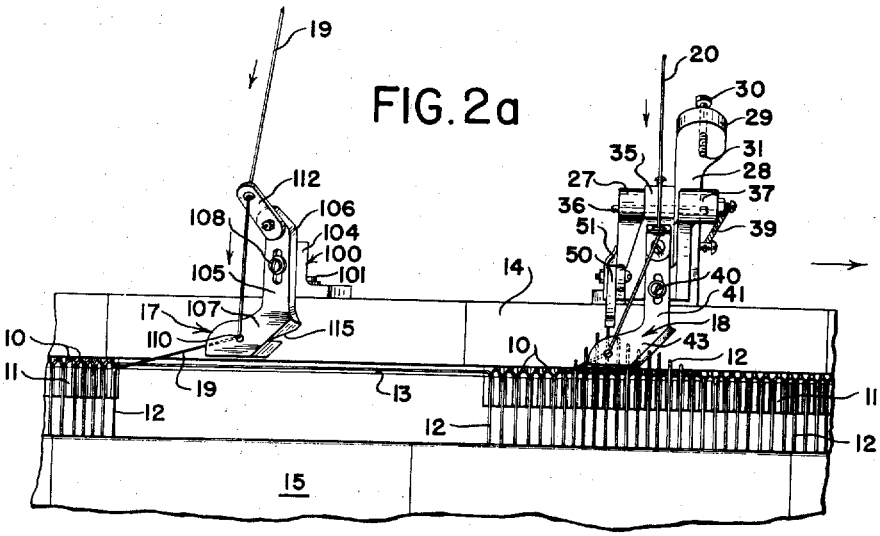
FIGS. 2a through 2d are fragmentary elevational views respectively corresponding to FIGS. 1a through 1d.

FIGS. 1a through 1d and FIGS. 2a through 2d illustrate, in plan and elevation respectively, successive stages during two changes from one knitting pattern to another, and back again, i.e., from plain knitting to rib knitting, and back to plain knitting. It will be subsequently seen that FIGS. 1a and 2a illustrate both the beginning and the end of the cycle of changes.

Figure 1B:
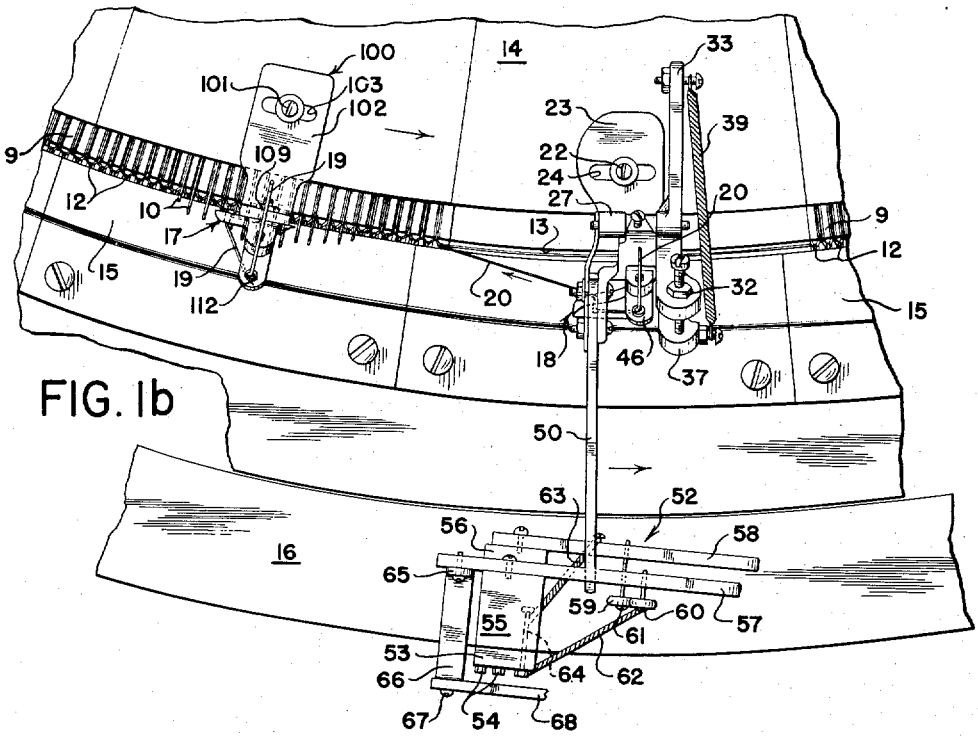

FIG. 1b is unique in that it is the only figure which shows, in plan, mechanism for actuating adjustable yarn feeds. In this figure the mechanism has just raised an adjustable feed. To simplify and to avoid obscuring the drawing, this mechanism is omitted in the other seven figures of the above described group.

Figure 3:
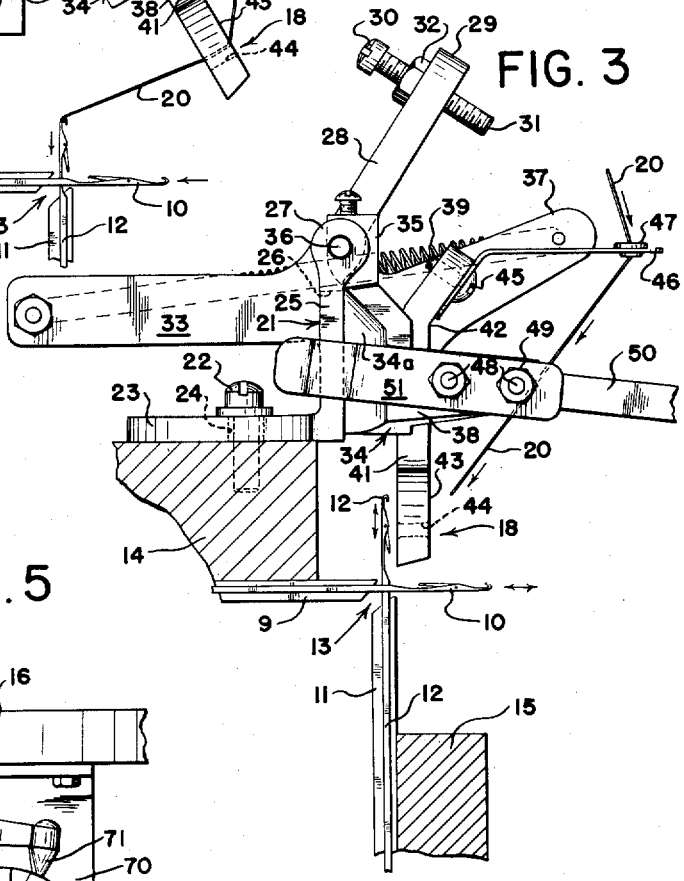

FIG. 3 is an enlarged side elevational view of an adjustable yarn feed in lowered position.

Figure 4:
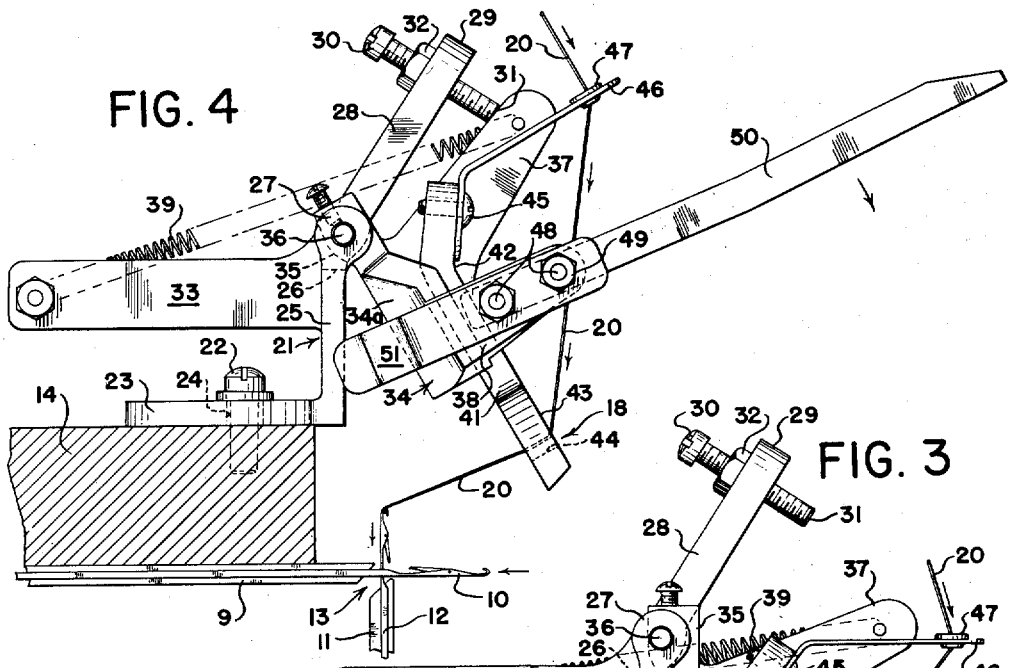

FIG. 4 is an enlarged side elevational view of an adjustable yarn feed in raised position.

In both FIGS. 3 and 4 some adjacent parts of the knitting machine are shown in section.

Figure 5:
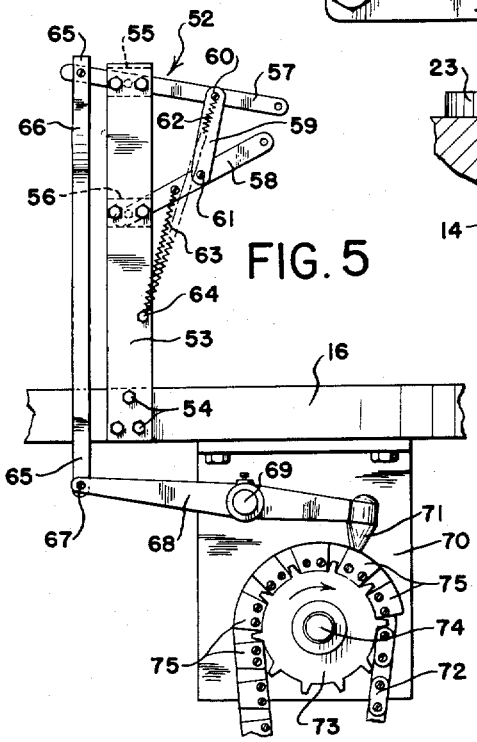
Figure 6:
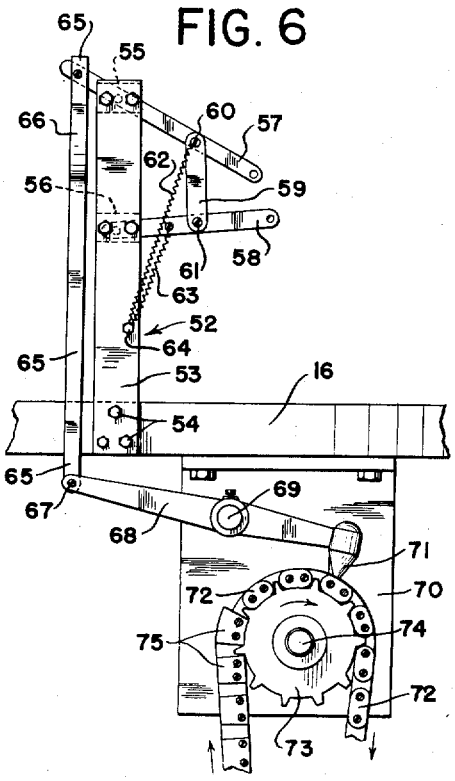
Figure 7:
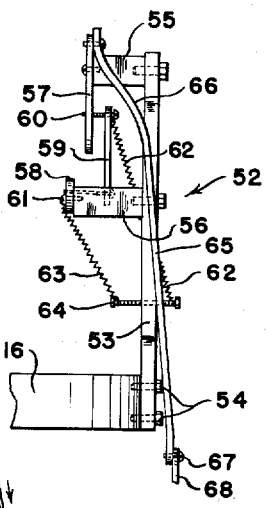

FIGS. 5, 6 and 7 are fragmentary elevational views of mechanism for selective automatic shifting of adjustable yarn feeds;

FIG. 5, a view directed toward the center of the machine, shows this mechanism set to raise oncoming adjustable yarn feeds;

FIG. 6, also directed toward the center of the machine, shows this mechanism set to lower oncoming adjustable yarn feeds;

FIG. 7 is another fragmentary elevational view of this mechanism rotated 90° with respect to FIG. 6.

Figure 8:
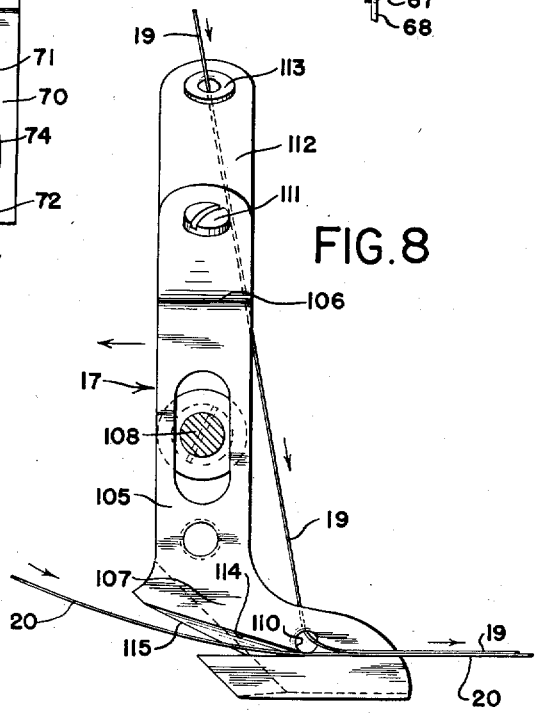

FIG. 8 is an inside elevational view, partly in section, of a fixed yarn feed.

Figure 9:
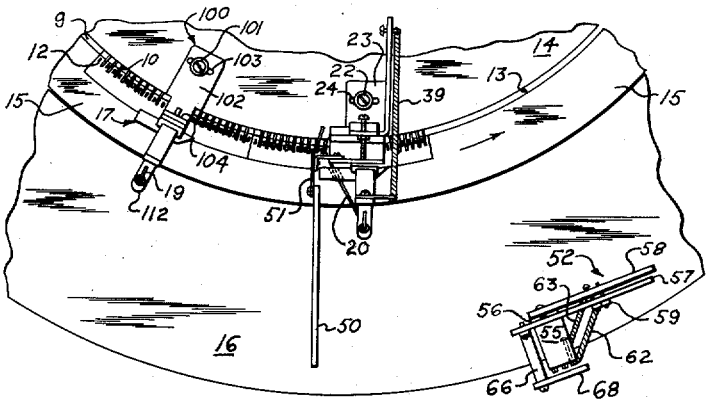
Figure 10:
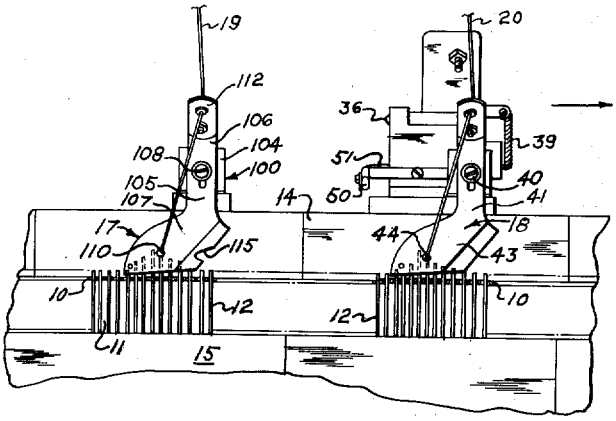
Figure 11:
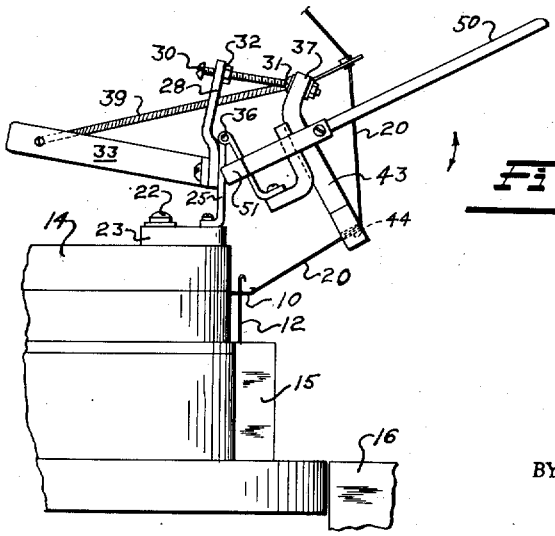

FIGS. 9, 10 and 11 are schematic views showing the same structure more clearly and precisely set forth in FIGS. 1a–1d, 2a–2d and 3–8. The identifying numerals employed in FIGS. 9, 10 and 11 correspond with those used in FIGS. 1a–1d, 2a–2d and 3–8, and accordingly, no separate description of FIGS. 9, 10 and 11 will be presented except to state that FIG. 9 is a schematic plan view showing a circular knitting machine adapted according to this invention, FIG. 10 is a front elevation showing yarn guides in down position, and FIG. 11 is a side elevation of a movable yarn guide in up position.

Figure 12A:
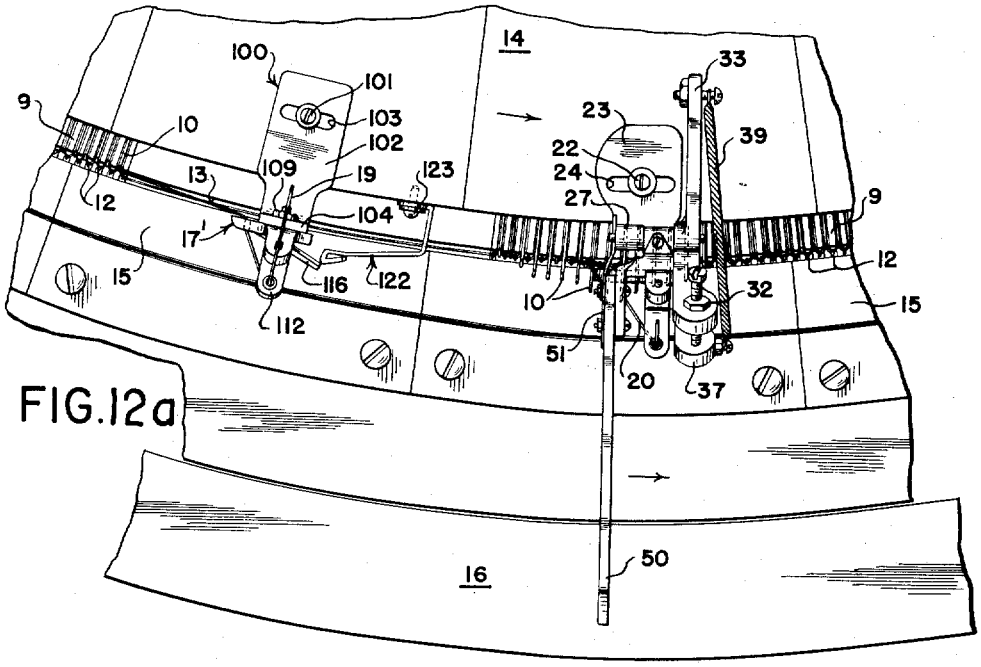
Figure 12B:
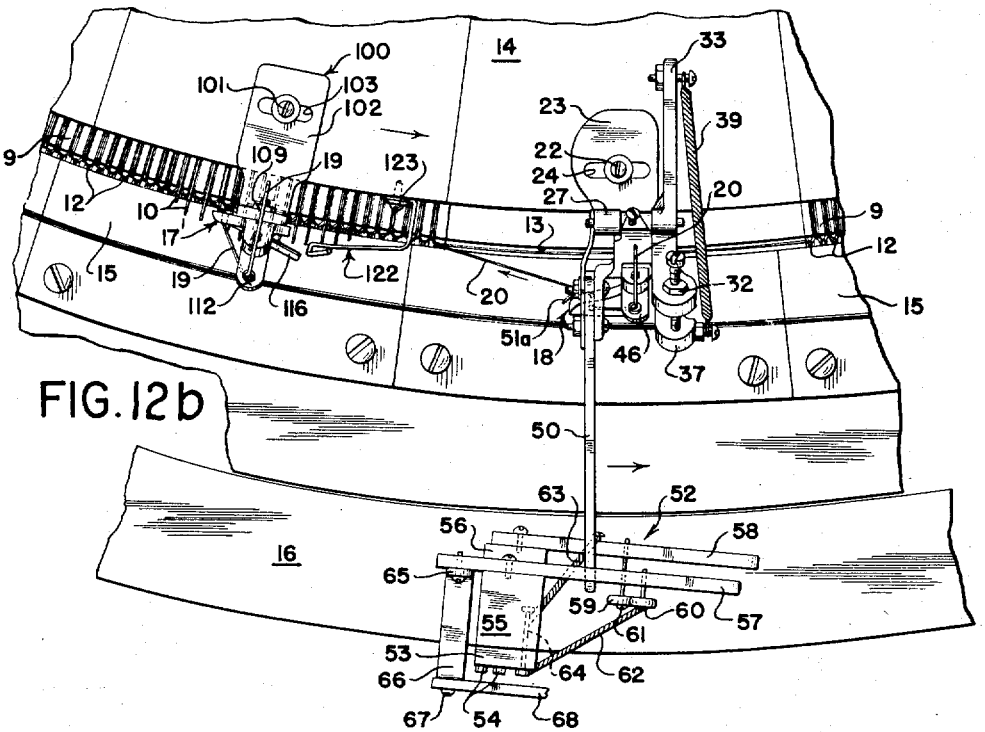

FIGS. 12a through 12f and FIGS. 13a through 13f correspond generally with FIGS. 1a through 1d and FIGS. 2a through 2d respectively, FIGS. 12a–12f and 13a–13f illustrating a preferred alternative embodiment of the invention. FIG. 12b is unique in that it is the only figure in the group of figures under consideration which shows, in plan, mechanism for actuating adjustable yarn feeds. To simplify and avoid obscuring the drawing, this mechanism is omitted in the other eleven figures of this group.

Figure 13A:
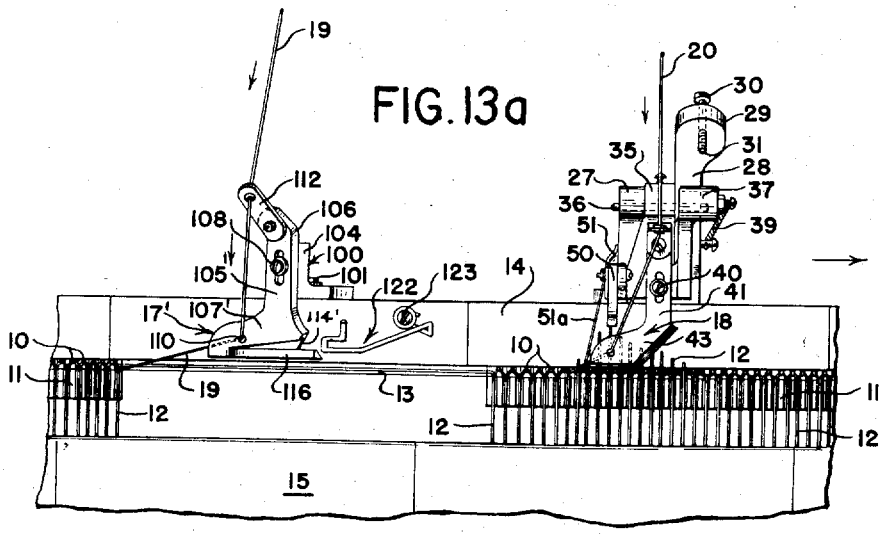
Figure 13B:
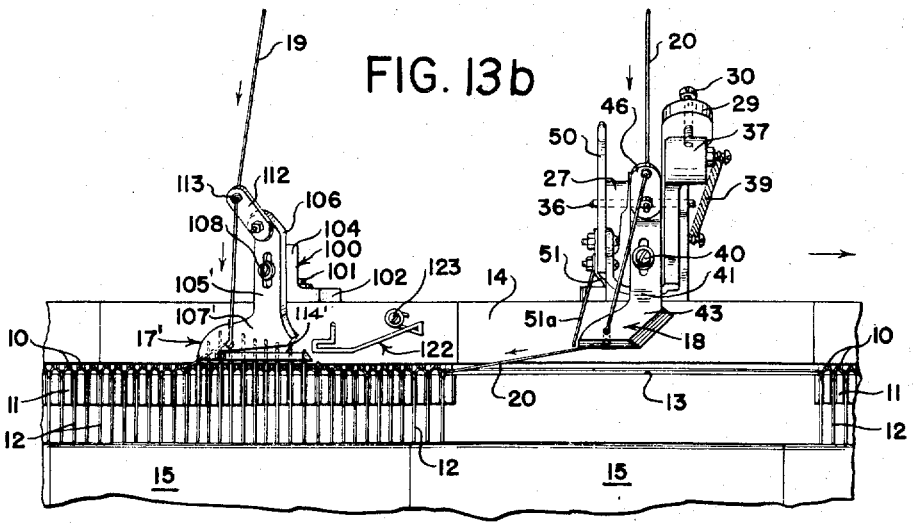
Figure 12C:
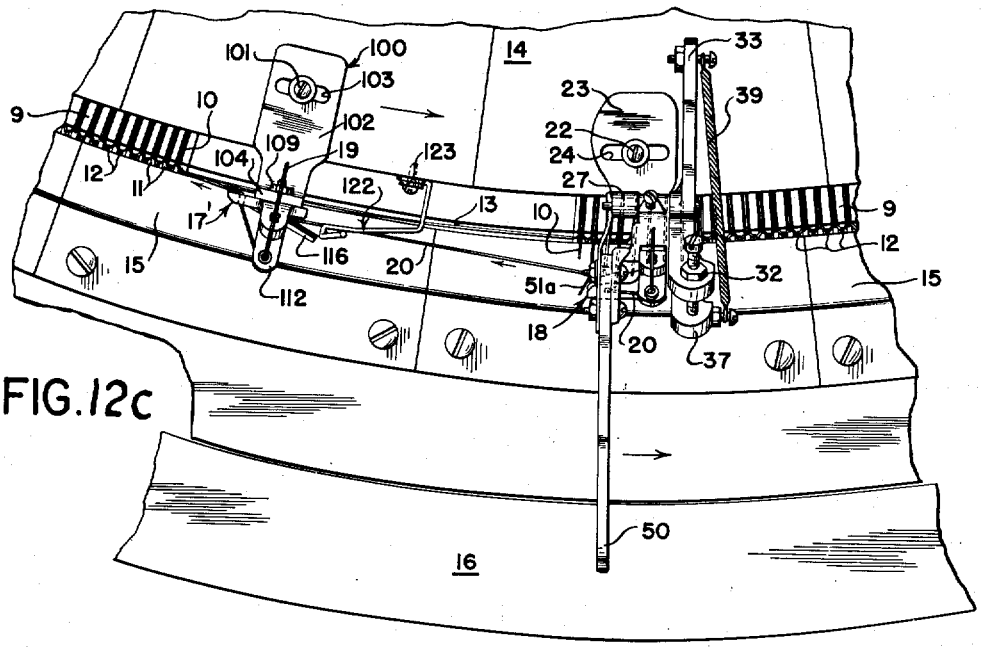
Figure 13C:
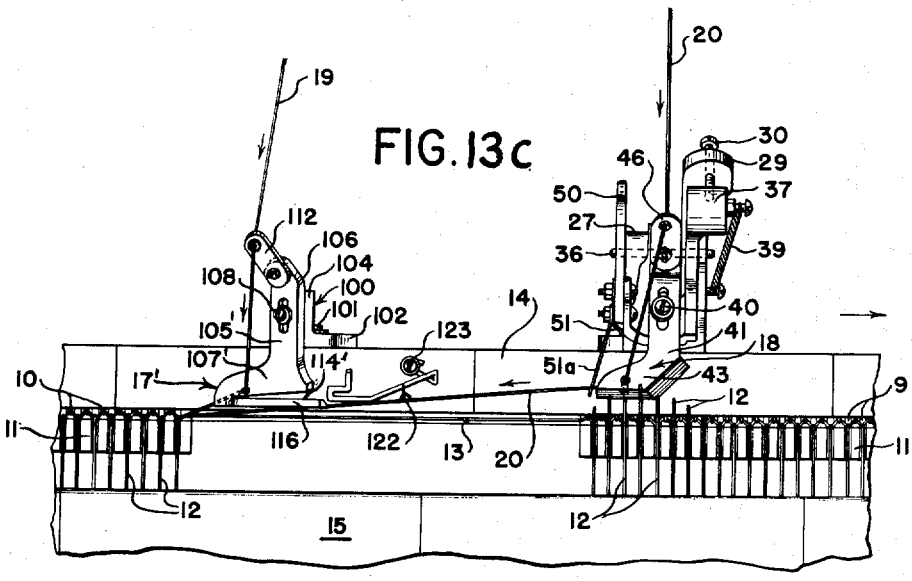
Figure 12D:
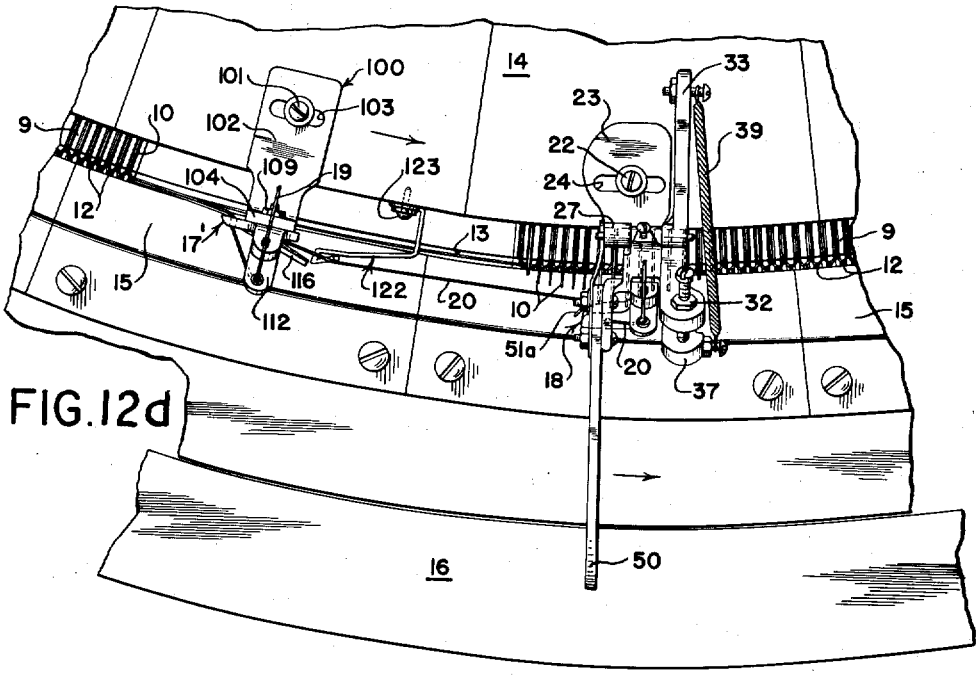
Figure 13D:
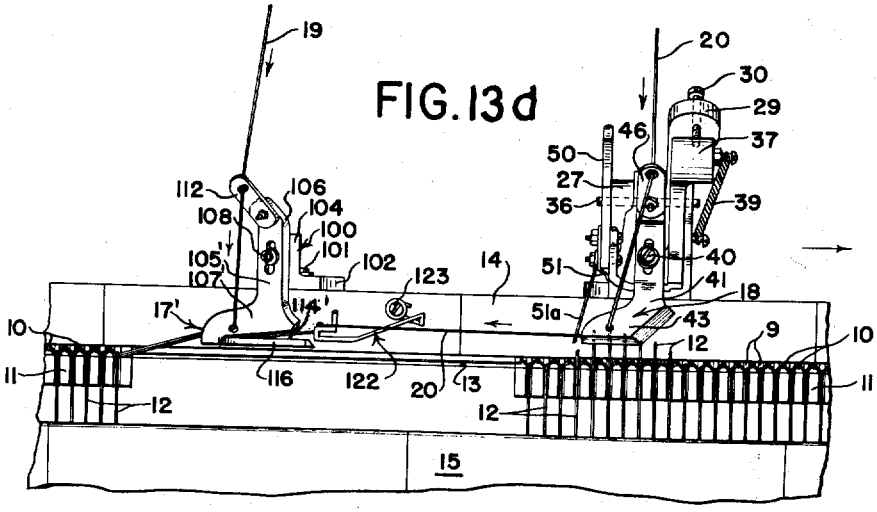
Figure 12E:
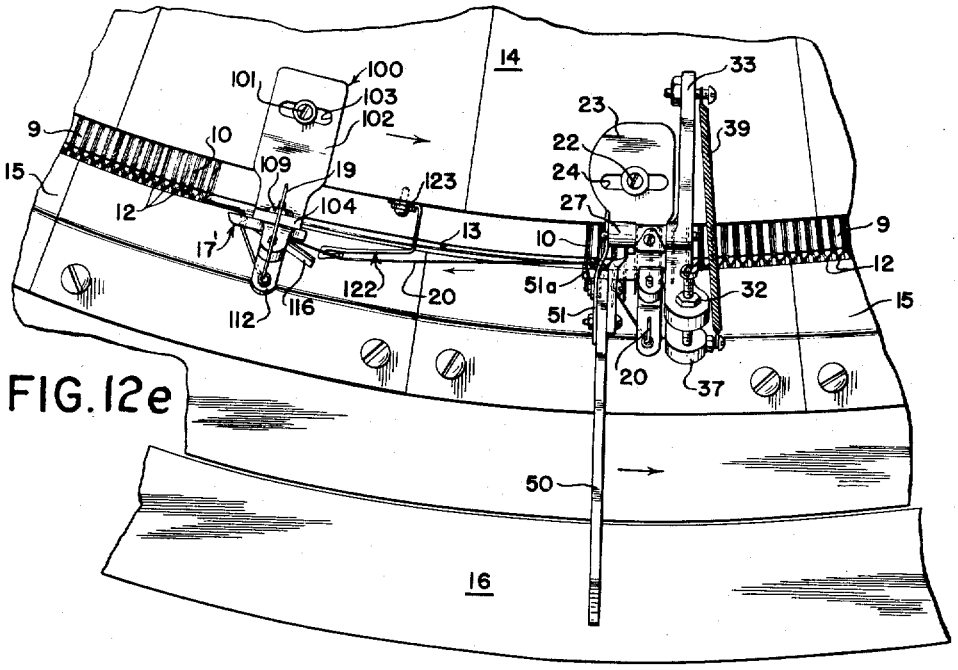
Figure 13E:
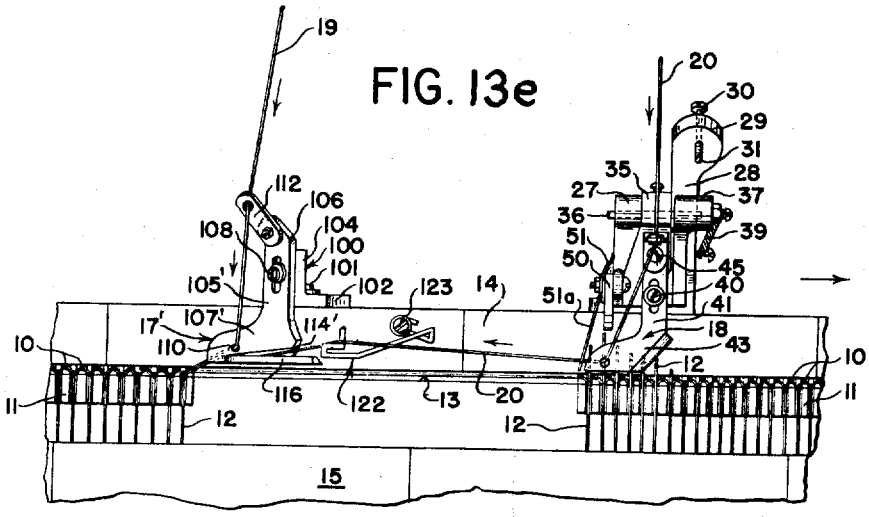
Figure 12F:
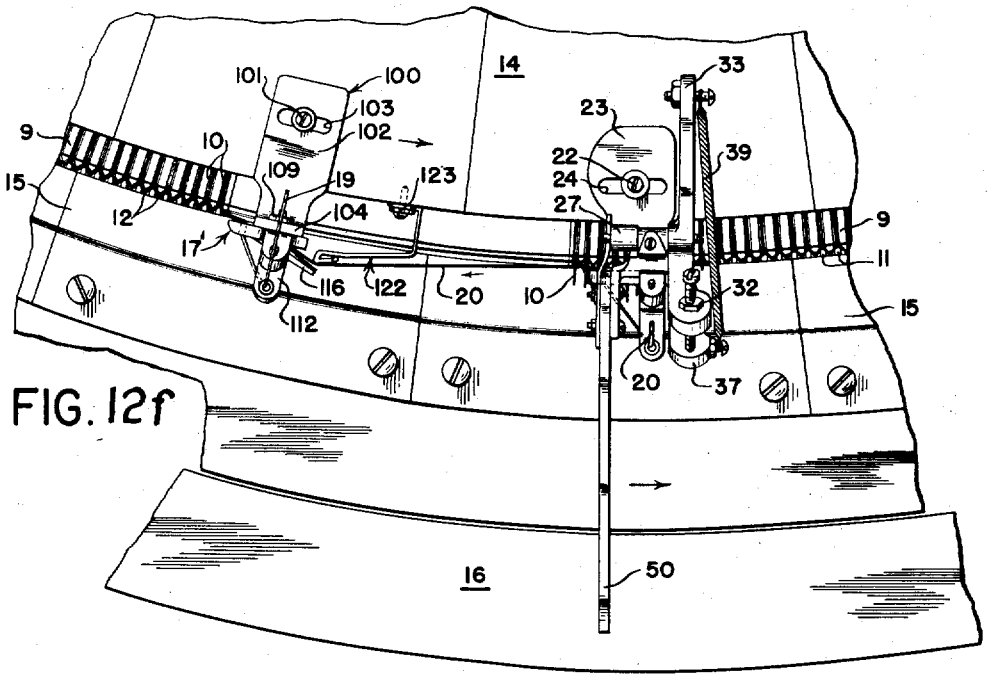
Figure 13F:
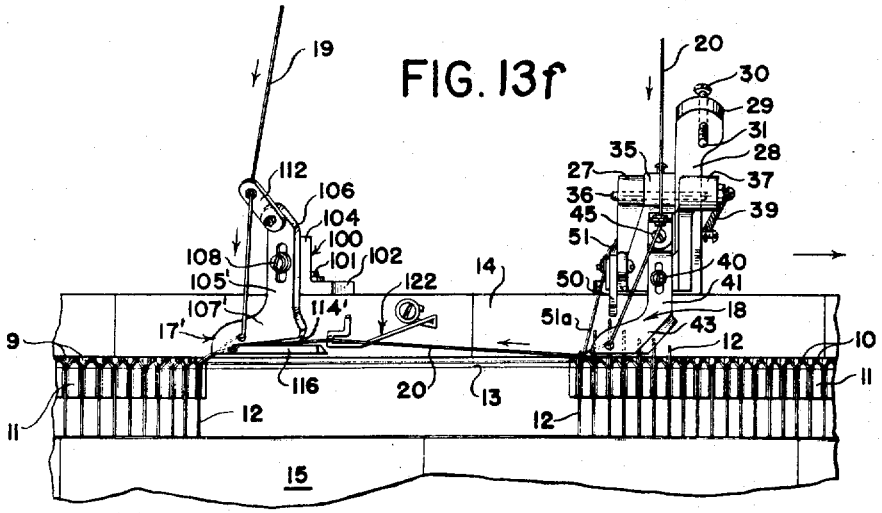
Figure 14:
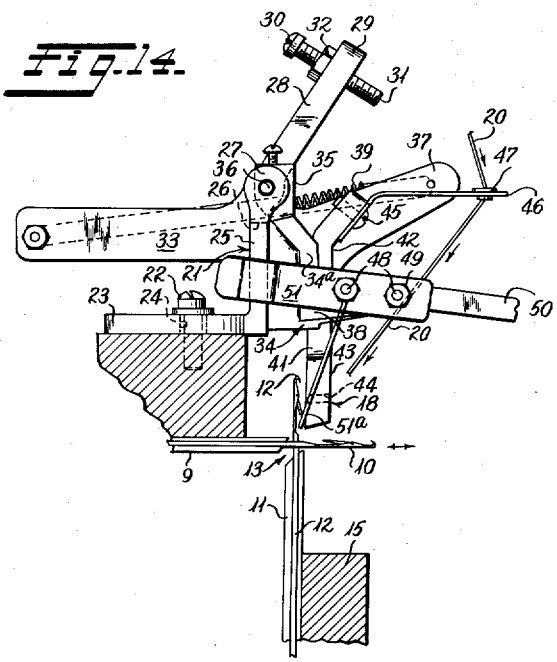

FIG. 14 is an enlarged side elevational view showing the adjustable yarn feed employed in FIGS. 12a–12f and 13a–13f in lowered position.

Figure 15:
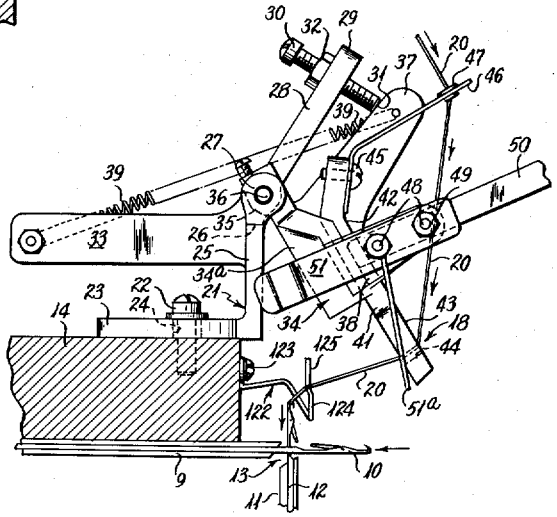

FIG. 15 is an enlarged side elevational view showing the adjustable yarn feed employed in FIGS. 12a–12f and 13a–13f in raised position.

In both FIGS. 14 and 15 some adjacent parts of the knitting machine are shown in section and guide 122, which is shown in FIG. 15 is omitted from FIG. 14 for clarity.

Figure 16:
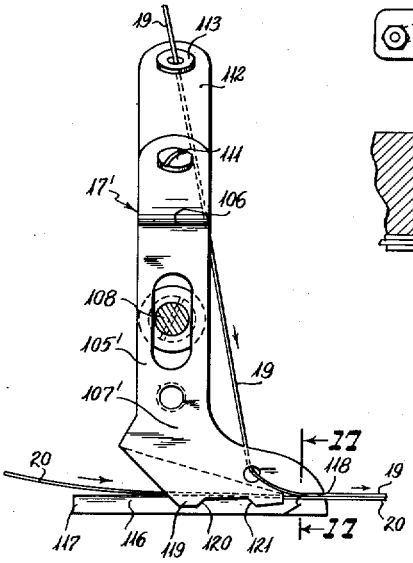

FIG. 16 is an inside elevational view, partly in section, of the fixed yarn feed employed in FIGS. 12a–12f and 13a–13f.

Figure 17:
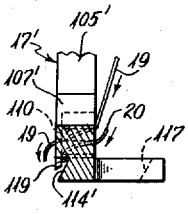

FIG. 17 is a section on the line 17—17 of FIG. 16.

Figures 18, 19:
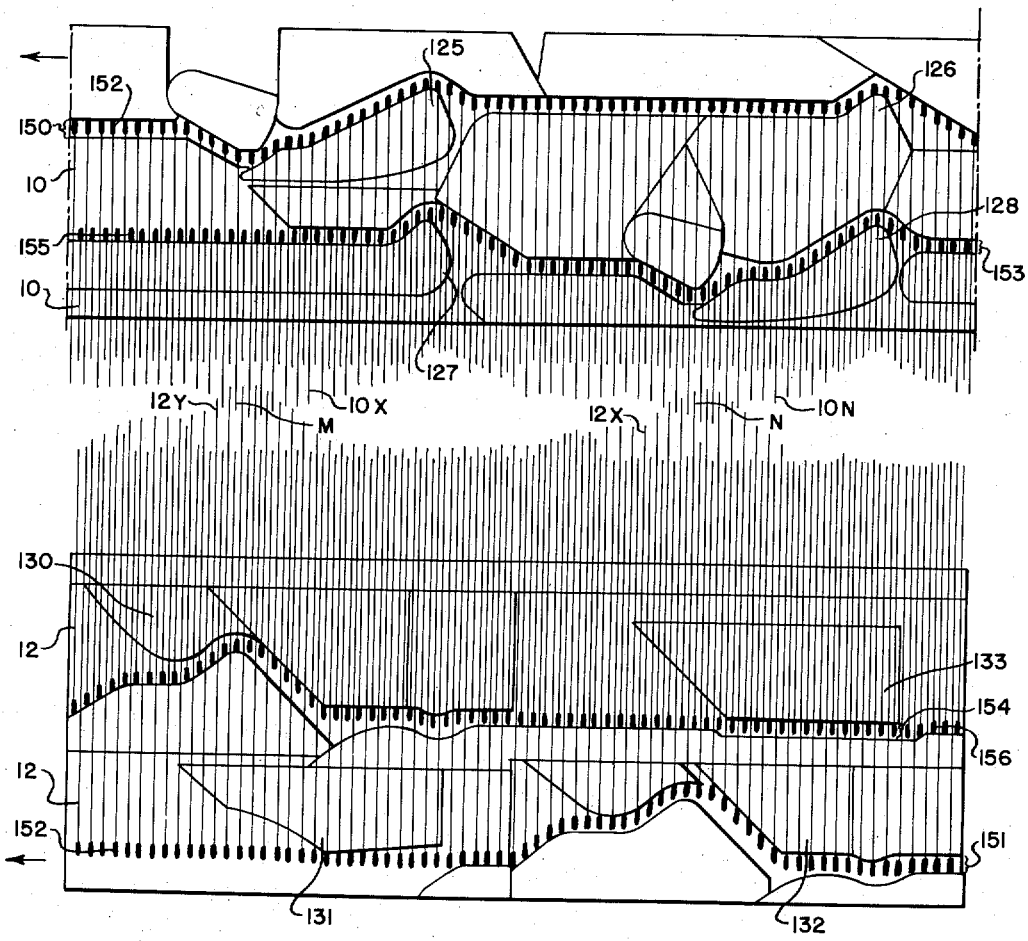

*FIGS. 18 and 19 are conventional, schematic illustrations of the needle actuating cams of the knitting machine, following the plan of FIGS. 3 and 4 of U.S. Patent 929,393.*

To facilitate an understanding of the relationship of the present apparatus to the type of circular knitting machine to which it is assumed to be applied herein, a brief description of such a machine is set forth below.

The circular knitting machine includes a suitable main frame in which is journaled a vertically disposed main shaft. Neither the frame nor the shaft is shown in the drawing, but both will be perfectly familiar to those versed in the art. Surrounding the main shaft, and suitably supported at a proper level thereon, but not rotating with the shaft, is a horizontally disposed coaxial angular guide 9 for a bank of dial needles 10 (FIGS. 1a–1d, 3 and 4). Supported by the main frame is a vertically disposed cylindrical guide 11 for a bank of cylinder needles 12 (FIGS. 2a–2d, 3 and 4). The guide 11 is coaxial with both the main shaft and the annular guide 9, and, in usual manner, the periphery of the annular guide 9 is near, but does not meet, the upper edge of the cylindrical guide 11; and a circular opening 13 (FIGS. 3 and 4) exists between the guides to accommodate the tubular fabric produced by this type of machine. It will be readily understood that guides 9 and 11 are stationary.

The upper surface of the annular guide is provided with radial grooves spaced at regular angular intervals, and the dial needles are carried within these grooves for reciprocation therein, with the hooks and latches of the needles being at their outer ends (FIGS. 3 and 4). The outer surface of the cylindrical guide is provided with vertical grooves also spaced at regular angular intervals—these last named grooves being staggered angularly with respect to the radial grooves mentioned above—and the cylinder needles are carried within the vertical grooves for reciprocation therein, with the hooks and latches of the needles being at their upper ends (FIGS. 3 and 4). Sequentially, in the knitting operation, the dial needles advance centrifugally, and retract; and the cylinder needles advance upwardly, and retract (FIGS. 3 and 4, *18 and 19*).

Rigidly mounted on the main shaft is a circular turntable 14 (FIGS. 1a–1d, 2a–2d, 3 and 4). The lower surface of this turntable is practically in contact with the upper surface of the annular guide 9, and, when the machine is in operation, cams [(not shown)] *125, 126, 127, 128* (*FIG. 18*) provided on the bottom of the turntable 14 effect reciprocation of the dial needles in usual manner. Also rigidly mounted for rotation with the main shaft is a flanged cylindrical member 15 (FIGS. 1a–1d, 2a–2d, and 3) the inner surface of which is practically in contact with the outer surface of the cylindrical guide 11, and, when the machine is in operation, cams [(not shown)] *130, 131, 132, 133* (*FIG. 19*) provided on the inside of member 15 effect reciprocation of the cylinder needles in usual manner.

Surrounding the flange of member 15 is another stationary annulus 16 (FIGS. 1a–1d, 2a–2d and 3–7) which is supported by the main frame. The annulus 16, in conventional circular knitting machines of this type, has the principal function of a safety guard to minimize accidental contact of a knitter with rotating parts of the machine. However, as will be seen annulus 16, has in connection with the apparatus of the invention, an additional function.

As the turntable 14 and the member 15 rotate the needles of both banks are sequentially reciprocated. The cams of the turntable 14 and of the member 15 are so shaped that the needles are actuated in groups, as illustrated in FIGS. 1a–1d, [and] 2a–2d, *18 and 19*.

*As shown in a conventional schematic way in FIGS. 18 and 19, the needles 10 of the dial bank and the needles 12 of the cylinder bank are not all actuated alike, but instead, they are actuated in two groups, the first group, Y, X, consisting of every other needle, the second consisting of the remaining needles. As shown in FIGS. 18 and 19, a well-known way of accomplishing this actuation is by providing cam grooves 150, 151 for the dial and cylinder, respectively, to cooperate with the long butts 152, provided on the group X needles and other cam grooves 153, 154, for the dial and cylinder, respectively, to cooperate with the short butts 155, 156 provided on group Y needles. As a consequence of the particular relative geometric relationship of the cams on the cylinder and dial illustrated in FIGS. 18, 19 the dial needles 10X and cylinder needles 12Y cooperate to receive a yarn at a feed designated M and the dial needles 10Y and cylinder needles 12X cooperate to receive a yarn at a feed designated N. With the direction of rotation shown in FIGS. 18, 19, M is the "trailing feed" to N in the sense in which this term is hereinafter employed. For clarity of illustration, merely, only that group of needles being actuated adjacent a particular feed is shown in FIGS. 1a–1d, 2a–2d, 9, 10, 12a–12f, and 13a–13f.*

*In FIGS. 18 and 19, the arrows illustrate the direction of rotation of the turntable 14 and of the member 15 relative to the needles.*

In a conventional circular knitting machine of the type described a circular arrangement of angularly spaced yarn feeds is mounted near the periphery of the turntable. These yarn feeds are all alike, and each is fixed so that its yarn is invariably delivered substantially at the circular knitting station so that the yarn may be engaged and worked by the needles while the feed is immediately passing during operation of the machine.

In converting the conventional machine to utilize the present invention all original yarn feeds mounted on the turntable are removed; and a circular arrangement of yarn feeds constructed according to the invention is mounted on and near the periphery of the turntable as a substitution. The yarn feeds of the present apparatus are of two types, both novel, with one type being fixed like a conventional yarn feed, but of different construction, and with the other type being adjustable, and therefore entirely different from a conventional yarn feed. The two novel types of yarn feeds are designated 17 and 18 respectively. In the embodiment of apparatus illustrated herein the circular arrangement of yarn feeds comprises a number of each of feeds 17 and 18 alternating around the turntable. The two types of novel yarn feeds are subsequently described in detail; but it is essential at the outset to understand that each novel fixed feed, like a conventional fixed feed, invariably delivers its yarn substantially at the knitting station, while each adjustable feed, which may be raised or lowered, operates like a conventional feed when adjusted to lowered position, as best shown in FIG. 3, but when adjusted to raised position, as best shown in FIG. 4, withdraws its yarn out of reach of the knitting station so that the yarn cannot be engaged and worked by the needles that the adjustable feed is immediately passing.

Since the circular arrangement of yarn feeds 17 and 18 alternate around the periphery of the turntable it is unnecessary herein to illustrate more than one consecutive pair of the feeds. See FIGS. 1a–1d and FIGS. 2a–2d, wherein a fixed feed 17 is shown to the left and an adjustable feed 18 appears to the right.

Figure 2B:
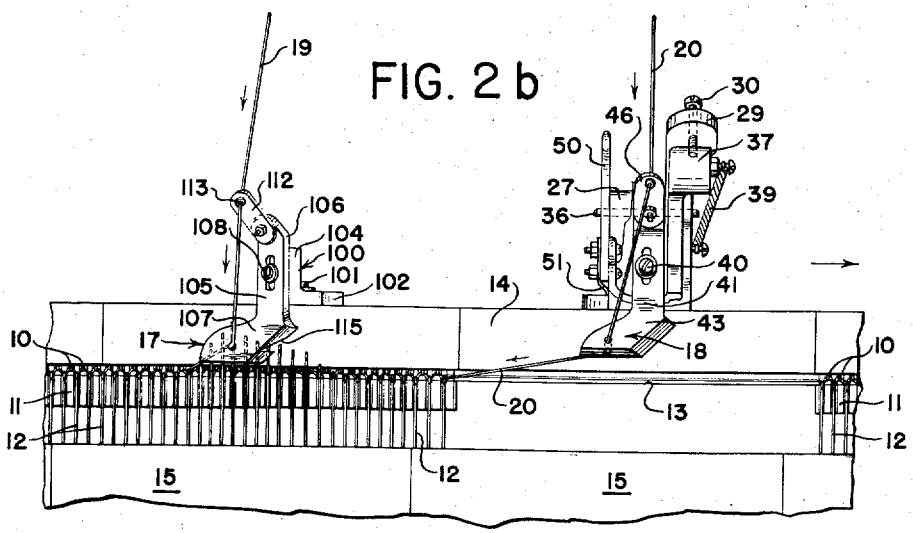

It will be noted in certain figures of the group comprising FIGS. 1a–1d and 2a–2d, as, for example, FIGS. 1a and 2a, with respect to a feed 18, and FIGS. 1b and 2b, with respect to a feed 17, that the cam-actuated groups of needles appear to rotate substantially in register with the feeds. Of course, neither bank of needles rotates; but because the cams of turntable 14 and of member 15 rotate with the feeds 17 and 18, it may be said that a group of needles actually does rotate in synchronism and substantially in register with each yarn feed, but the component needles of the group are always changing since the needle banks are stationary. What the eye sees, with respect to needle groups pacing the yarn feeds, is the equivalent of a series of wave crests traveling across an otherwise stationary body of water.

It will be noted in FIGS. 1a and 2a, 1b and 2b, and 3, that the reciprocating dial needles pass beneath the feeds, and the reciprocating cylinder needles pass behind, i.e., on the inner side of the feeds.

When all yarn feeds—the fixed feeds 17 and the adjustable feeds 18—are directly delivering yarn to the needles they are currently passing while the machine is in operation, the product of the machine, in the present case, is regularly knitted tubular fabric. Under the conditions set forth immediately above all adjustable feeds 18 are in lowered position, as in FIG. 3. When only the fixed feeds 17 are directly delivering yarn to the needles they are currently passing, and all adjustable feeds 18 are in raised position, as in FIG. 4, the yarn of the latter feeds is moved out of reach of needles being passed, and, as will be more fully explained below, the yarn of each adjustable feed 18 is transferred to its immediately trailing fixed feed 17, and the last named feed then delivers, in the present case, two strands of yarn to the needles being currently passed. See FIGS. 1c and 2c. Under these conditions the product of the machine is rib knitted tubular fabric. *It is apparent that, on an interlock machine, while body fabric is being produced a fabric will be formed of single strand loops in the usual manner knitting on all needles of cylinder and dial; while rib fabric is being formed, on the other hand, a fabric will be formed of double strand loops knitting only on alternate needles of cylinder and dial and the*

*stitches remaining on the needles not knitting will be cast off after the formation of the last interlock course.*

It will be obvious that means are required for shifting the position of the adjustable yarn feeds so that either regular knitted tubular fabric may be produced or rib knitted tubular fabric may be produced. Thus, the invention includes mechanism for selectively and automatically shifting the adjustable yarn feeds.

Before a detailed description of the yarn feeds and the means for shifting the adjustable feeds, it seems best here to say that the gist of the invention is the structure of the two types of yarn feeds mounted on the turntable and the mechanism which is provided for shifting adjustable yarn feeds. Where a conventional circular knitting machine of the described type is involved, no other changes are required. In the type of circular knitting machine selected herein to facilitate the disclosure there would ordinarily be, above the turntable and the yarn feeds mounted thereon, a rotating superstructure supporting angularly spaced yarn guides, tensioning devices, and cones of yarn, all of which are omitted in the drawing. Also the main frame of the machine and the main shaft are not illustrated.

It will be immediately evident from FIGS. 1a–1d that all segments of arcs therein would appear as concentric circles if the figures were complete horizontal sections of the machine. Also the center of these circles, which, of course, would be above the actual figures, is the axis of the vertically disposed main shaft of the machine. The area covered by these figures is ample for the purposes of this application as will be presently made clear.

For reference, a strand of yarn leading from a cone (not shown) to, and being fed by a fixed feed 17, is designated 19; and the strand of yarn leading from another cone (not shown) to, and being fed by an adjustable feed, is designated 20. In FIGS. 1c, 2c, 1d and 2d the yarn 20 relating to the adjustable feed 18 is clearly seen to extend from that feed to the next trailing fixed feed 17; and these four figures, as well as FIG. 8, show both yarns 19 and 20 being fed together from a fixed feed 17. See FIG. 4 also.

The reference numerals 17 and 18, which respectively designate a fixed feed and an adjustable feed, are general indices, and include aggregatively all parts of the feeds to which they relate. Of course, in the following detailed description of the structure of the two types of yarn feeds provided on the present machine certain of their component parts are assigned specific reference numerals.

It is, of course, true that when the adjustable feeds 18 are lowered, as in FIG. 3, all feeds of the machine have functions equivalent to those of fixed feeds of a conventional circular knitting machine of the described type. But it is equally true that when the adjustable feeds of the machine are raised, as in FIG. 4, all feeds of the machine have functions which differ from those of the conventional fixed feeds.

It appears best to describe, first, the structure of an adjustable yarn feed 18. A feed of this type is seen in plan in FIGS. 1a–1d. In FIGS. 2a–2d a feed 18 is shown in elevation, and is a projection from the plan view above. FIGS. 2a–2d are fragmentary views of the outside of the machine and are directed, at approximately the center of the adjustable feed, toward the center of the machine. Accordingly, in FIGS. 2a–2d the fixed feed 17 is seen somewhat obliquely. FIGS. 3 and 4 are enlarged side views of an adjustable yarn feed 18, and both figures are partly in section.

The base of an adjustable yarn feed device is a bracket 21 which is secured, as shown in FIGS. 1a–1d, 3 and 4, to, and near the periphery of the turntable 14 by means of a suitable cap screw 22. Since the bracket 21 is of somewhat irregular design in the illustrated embodiment it is preferably a casting. A lowermost horizontal pedal portion 23 of the bracket engages the upper surface of the turntable. Portion 23 of the bracket is slotted at 24 so that a limited adjustment may be had when the bracket is secured by the screw 22. From the outer edge of the portion 23 of the bracket rises a vertical portion 25 which is slotted substantially centrally at the top at 26 (dotted line in FIGS. 3 and 4). The left hand upper part of portion 25 adjacent each slot at 26 is enlarged, and provides a knob 27. See, also, FIGS. 3 and 4. Across the slot at 26, from the knob 27, i.e. to the right in FIGS. 1a–1d the portion 25 rises to the level of the top of the knob, and an arm 28 extends at a slant outwardly with respect to the center of the machine. This arm appears in FIGS. 1a–1d, 2a–2d, 3 and 4, but is best seen in the latter two figures. The outer end of arm 28 is widened at 29; and a screw 30 is threaded through the end portion of arm 28 at right angles to the longest dimension of the arm. The end 31 of the screw 30 is employed as a *stop* [detent] (see FIG. 4). A jam nut 32 is provided for locking the screw and, of course, its end 31, at a particular position with respect to arm 28. Extending roughly toward the center of the machine from portion 25 of the bracket 21 (to the right of the slot at 26 in FIGS. 1a–1d) is a horizontal arm 33. An irregular member 34, preferably a casting in the illustrated embodiment, has a portion 35 which fits freely within the slot at *26* [36] of portion 25 of bracket 21. A pin 36 passes through the knob 27, the portion 35 of member 34, and that part of portion 25 of bracket 21 opposite knob 27. The pin is force fitted in knob 27 and the opposite part of portion 25 of the bracket; but the pin passes freely through portion 35 of member 34, whereby that member is hingedly connected to the bracket 21. Compare FIGS. 3 and 4.

Member 34 comprises a portion 34a, from which arms 37 and 38 extend. When the feed 18 is in lowered position as in FIG. 3, the inner surface of portion 34a abuts against the outer surface of portion 25 of bracket 21. When the feed 18 is in raised position, as in FIG. 4, the outer end of arm 37 of member 34 abuts the end 31 of screw 30. Extending between the inner end of arm 33 of bracket 21 and the outer end of arm 37 of member 34 is an *tension* [extension] spring 39. Mounted on the outer side of member 34, and secured thereto by a screw 40, is an element 41 which, in the strictest sense, is a yarn feed proper. Its shape is that of a bar having a bend at 42 near its upper end and a shoe 43 at its lower end. This element is so well known in the circular knitting machinery art that it hardly requires a detailed description herein. In a conventional circular knitting machine an element of this class is employed as the fixed yarn feed proper; and it is secured in suitable manner to a simple bracket mounted on the turntable. The element is preferably of steel, and is hard, and a bore 44 in shoe 43, in the conventional knitting machine, serves, as the last yarn guide before the yarn is presented to the cooperating knitting needles. Secured by means of a screw 45 to the top portion of element 41 above the bend at 42 is an extension 46 having at its outer end a bore fitted with a smooth and hardened yarn guide 47. The yarn 20 is clearly shown in FIGS. 3 and 4. The structure of the element 41 and its extension 46 is conventional.

Suitably secured to arm 38 of member 34, as by screws 48 and nuts 49, is an outwardly extending finger 50 (broken away in FIG. 3), and an inwardly extending and slightly bent leaf spring 51 (see FIGS. 1a–1d particularly; also FIGS. 3 and 4), the inner end of which engages an edge of portion 25 of bracket 21 under tension and thereby produces a slight braking effect against pivotal movement of member 34 around the pin 36. Of course it will be readily understood that the bracket 21 does not ordinarily move relative to the turntable 14 but that all other parts comprising the device referred to as the adjustable yarn feed—excepting only the spring 39—may rotate about the axis of the pin 36 from an extreme raised position, as illustrated in FIG. 4, to an extreme lowered position, as illustrated in FIG. 3. A feature of the well known snap switch is included in the structure of an adjustable yarn feed in that the feed will remain in a raised position (FIG. 4) until forced by suitable means to a lowered position (FIG. 3), and will then remain in the last named position until forced by suitable means back to the first main position.

It is best seen in FIGS. 3 and 4 that only when the adjustable feed is in lowered position [and] *do* the knitting needles which the feed is currently passing reach and work with the yarn 20. Plainly, as seen in FIG. 4, the shoe 43 of element 41 is too remote from needles being immediately passed by the adjustable feed for these needles to reach and work the yarn 20.

It will be plain that [any] *the* adjustable (feed) *feeds* 18 may be shifted from raised to lowered position, or the reverse, without varying the speed of operation of the machine simply by causing the outer portion of finger 50 to engage during rotation of the turntable and at the proper time any suitable cam surfaces supported on a non-rotating part of the machine.

Thus a simple mechanism generally designated 52 in its entirety, and shown in FIGS. 1b, 5, 6 and 7, is provided for the purpose of effecting [selective and automatic] shifting of fingers 50 of adjustable feeds 18. This mechanism is mounted on the outer stationary safety guard annulus 16 of the machine, as best shown in FIG. 1b. FIGS. 5 and 6 are elevational views of the mechanism and these views are directed toward the center of the machine. FIG. 7 is an elevational view of the mechanism taken at 90° to the angle of view of FIGS. 5 and 6.

The shifting mechanism for adjustable yarn feeds comprises, as best seen in FIGS. 5 and 6, a post 53 which is mounted by means of suitable cap screws 54 on the stationary safety guard annulus 16. Rigidly mounted on the post 53 at the top thereof is an inwardly extending spacer block 55; and also mounted in like manner on the post 53 considerably lower than the top thereof is another inwardly extending spacer block 56. Block 55 only may be seen in FIG. 1b but both blocks are clearly shown in FIG. 7. Pivotally mounted at the inner end of block 55 is a lever 57, the under surface of which serves as a cam (see below). Pivotally mounted at the inner end of block 56 is another lever 58, the upper surface of which serves as a cam (see below). To the right of post 53 as seen in FIGS. 5 and 6, the levers 57 and 58 are coupled together by a link 59, the link having a pivotal connection with lever 57 at 60, and a pivotal connection with lever 58 at 61. *Tension* [Extension] springs 62 and 63 respectively extend from connections at 60 and 61 to a suitable means of attachment at 64 on post 53. See FIGS. 5, 6 and 7. Thus, both levers 57 and 58 are urged downwardly to the right of post 53 (FIGS. 5 and 6).

As seen in FIGS. 6 and 6 lever 57 extends to the left of its pivotal mount at the inner end of block 55; and a link 65 is pivotally connected to lever 57 near its left hand end. Link 65 extends downwardly from lever 57, and being bent at 66, as shown in FIG. 7, freely passes outside the periphery of guard annulus 16 and slightly below the same, where the link is pivotally connected at 67 to a lever 68. The fulcrum of lever 68 is a pin 69, or the equivalent, rigidly mounted on a bracket 70 suspended beneath the annulus 16. As of FIGS. 5 and 6, the right hand end of lever 68 is provided with a suitably shaped follower 71 which is urged by springs 62 and 63 against the convex surface of a chain 72 which meshes with a sprocket 73, the horizontal shaft 74 of which is journaled in bracket 70 and elsewhere (not shown) in the main frame of the machine. The shaft 74 and the sprocket 73 are driven to rotate, as indicated by an arrow in FIGS. 5 and 6, in timed relationship with the main shaft of the machine by means of a suitable transmission (not shown).

Of course, as the sprocket 73 rotates, the chain 72 is driven as indicated in the drawings. Lugs 75 are provided for attachment to selected links of the chain 72, these lugs functioning as cams for moving the follower 71 upwardly, as shown in FIG. 5, and thereby shifting levers 68, link 65, lever 57, link 59 and lever 58, as a train, from the position shown in FIG. 6 to that shown in FIG. 5. The reverse shift will be obvious.

The operation of the mechanism is so clearly indicated in the drawing that, with the foregoing text, it will be readily understood that when the levers 57 and 58 are set as shown in FIG. 5 the fingers 50 of adjustable feeds are moved upwardly by contact with the upper surface of lever 58, assuming the fingers to have been previously lowered, as in FIG. 3, upon arrival at the mechanism; and that when the levers 57 and 58 are set as shown in FIG. 6 the fingers 50 of adjustable feeds are moved downwardly by contact with the under surface of lever 57, assuming the fingers to have been previously raised, as in FIG. 4.

It will be plain from the foregoing that a shift from raised to lowered position of the adjustable feeds, or the reverse, may be caused to take place without any diminution of the operating speed of the machine. And, of course, the timing of a shift of the adjustable feeds is predetermined by the arrangement of lugs 75 on chain 72.

Mounted on the turntable 14 and near the periphery thereof, and to the right of an adjustable yarn feed 18, as in FIGS. 1a–1d and 2a–2d, is a fixed yarn feed 17. Of course there are a number of fixed yarn feeds 17 mounted near the outer edge of the turntable equal to the number of adjustable yarn feeds 18 likewise mounted; and thus a fixed yarn feed 17 is provided between each pair of adjustable feeds 18. Of course the angular distance between a fixed feed 17 and the next leading adjustable feed 18 is a matter expediently to be determined by the size of the machine, usually expressed in terms of the diameter of the circular knitting station thereof, or, approximately, the diameter of the turntable 14.

A typical fixed yarn feed 17 is shown in plan in FIGS. 1a–1d. The same feed is seen in oblique elevation in FIGS. 2a–2d wherein the feed is projected from the plan views above. An enlarged inside elevational view of a fixed feed 17 appears in FIG. 8.

The base of a fixed yarn feed device is a bracket 100 which is secured to, and near the periphery of, the turntable 14, as shown in FIGS. 1a–1d and 2a–2d, by means of a suitable cap screw 101. The bracket 100 may be a casting. A lowermost horizontal pedal portion 102 of the bracket engages the upper surface of the turntable. Portion 102 of the bracket is slotted at 103 so that a limited adjustment may be had when the bracket is secured by the screw 101. See FIGS. 1a–1d. From the outer edge of the portion 102 of the bracket rises a vertical portion 104. Rigidly mounted to the outside of portion 104 of the bracket 100 is an element 105, which corresponds to element 41 of an adjustable feed 18 (see above), but which is shaped somewhat differently at its lower end. The element 105 is, in the strictest sense, also a yarn feed proper. Its general shape is that of a bar having a bend at 106 near its upper end and a shoe 107 at its lower end. However, the shoes 44 and 107 are by no means exactly alike as may readily be understood by comparing FIGS. 1a–1d, 2a–2d, and 8. The largest part of element 105 is vertically disposed; and the means for rigidly mounting element 105 to vertical portion 104 of bracket 100 is a screw 108 and a nut 109.

Like element 41, element 105 is preferably of steel, and is hardened, and a bore 110 in the shoe 107 is equivalent to bore 44 in the shoe 41 and serves, here, normally as a last yarn guide before the yarn which invariably relates to the fixed feed 17 is presented to the cooperating knitting needles. Secured by means of a screw 111 to the top portion of element 105 above the bend at 106 is an extension 112, like extensions 46 of element 41, having at its outer end a bore fitted with a smooth and hardened yarn guide 113 (see FIG. 8, particularly). The yarn 19 is clearly shown in FIGS. 1a–1d, 2a–2d and 8, and is best shown in the last named figure. The structure of the extension 112 is conventional even though that of element 105 is novel. In any type of knitting the yarn 19 fed through the bore 110 is supplied directly to those needles which the fixed yarn feed 17 is currently passing.

Only seen in FIG. 8 is a wedge-shaped slot 114 on the inside of the shoe 107 of element 105. The slot is of triangular cross section, and extends from the trailing edge of the shoe and narrows to a point at the bore 110 of element 105. That portion of the slot near the trailing edge of the shoe is of such magnitude that this edge of the shoe is notched at 115 (see FIGS. 8 and 2a–2d).

FIGS. 1a–1d and 2a–2d are illustrative of successive stages of a complete cycle of knitting pattern changes. FIGS. 1a and 2a are illustrative of both the beginning and the end of a complete cycle of changes.

In FIGS. 1b and 2b, the first of which shows the shifting mechanism 52, a feed 18 has just been adjusted to raised position. Also, in these figures, it will be noted that the yarn 20, which primarily relates to feed 18, has been moved out of reach of any needles which might be present opposite that feed [(in practice, the dial and cylinder needles may as well be omitted, as indicated in the drawing, in the segments of arcs approximately opposite the mechanism 52),] and that, while yarn 20 can no longer be reached and worked directly opposite the feed 18, the yarn is, of course, still attached to work already completed at a point about midway between feeds 17 and 18. (Of course the work is barely visible, having been fed through the circular opening 13).

Figure 1C:
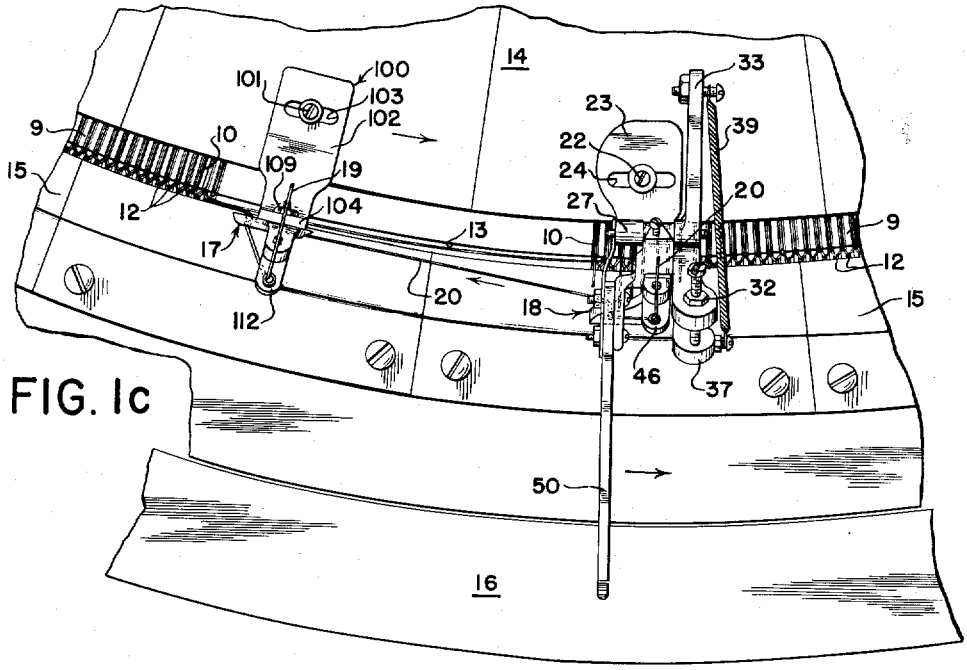
Figure 2C:
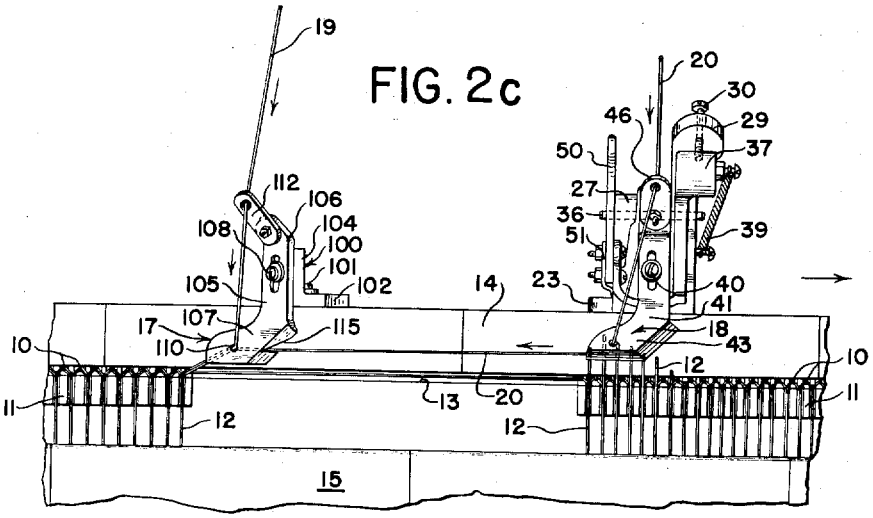

The fabric formed by the machine during the stages illustrated in FIGS. 1a and 2a is regularly knitted. In FIGS. 1b and 2b, the carriers are in the rib knitting position, while the yarn is still in the plain knitting position. In FIGS. 1c and 2c, the feed 18 is in the raised position and shows the yarn in rib knitting position.

Figure 1D:
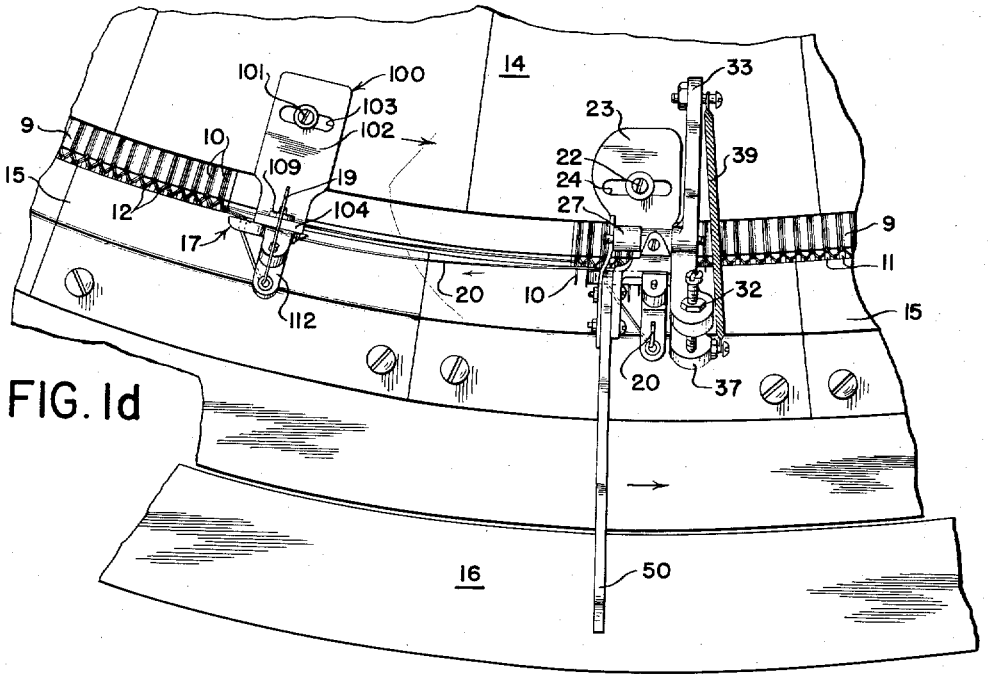
Figure 2D:
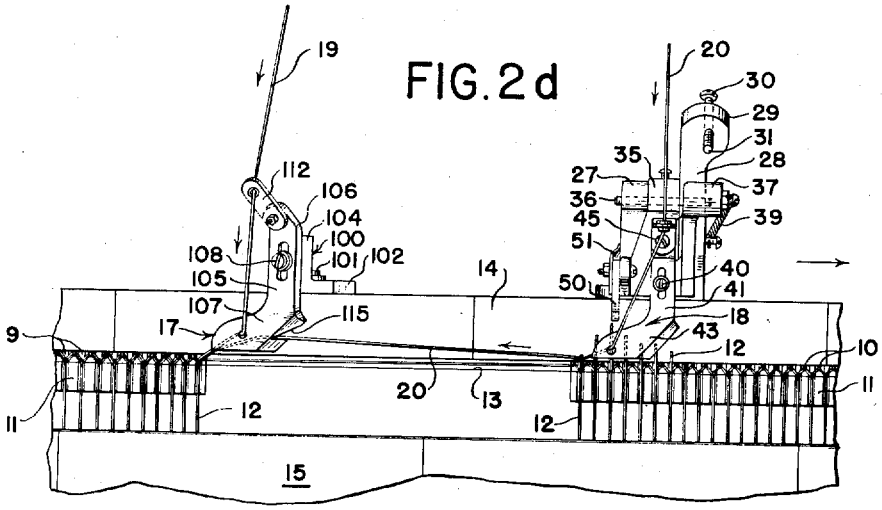

In FIGS. 1d and 2d, the carrier 18 is back in the plain knitting or lowered position and the yarn is getting ready to go back to the plain knitting position. FIGS. 1a and 2a complete the cycle, showing the yarn and carriers in plain-knitting position.

It will be noted in FIGS. 1c and 2c that the tensioned yarn 20 has been picked up by the advancing fixed feed 17. The yarn 20 is within the notch at 115, according to FIG. 1c; and, more clearly, in FIG. 8, is seen to be not only within the notch at 115 but in the slot 114; FIGS. 1c, 2c, and 8 indicate that yarns 19 and 20 are both being directly fed by the trailing feed 17, the first two figures showing this positively. In FIGS. 1c and 2c the feed 18 is in the raised position.

In FIGS. 1d and 2d the feed 18 is in lowered position, and very presently yarn 20, which is shown in these figures to be still presented to the needles by feed 17 along with yarn 19, will snap out of the slot 114 because yarn 20 has now been engaged by needles just being passed by feed 18. The fabric formed by the machine during the stages illustrated in FIGS. 1c and 2c, is rib knitted. The cycle of pattern changing is nearly completed.

An alternate embodiment is shown in FIGS. 12a–12f, 13a–13f, 14, 15, 16 and 17 in which the circular knitting machine is identical with that shown in FIGS. 1a–1d, 2a–2d, 5, 6, 7 and 8, like numerals being employed to denote identical parts and primed numerals being employed to denote corresponding parts, the structures of which have been altered in producing the alternate embodiment. Accordingly, the description of the alternate embodiment which follows will be substantially confined to the modifications which have been made.

Best shown in FIGS. 13a–13f (but also compare FIGS. 16 and 17) is a sharp wedge-shaped slot 114' extending from near the leading edge to the trailing edge of shoe 107' of element 105'. The lower portion 116 of the shoe 107' is all but cut away from the element 105' and is bent slightly outward from shoe 107' as best shown in FIGS. 12a–12f and 17; but also see FIGS. 13a–13f. The inner surface 117 of portion 116 is beveled. See FIGS. 12a–12f and 17. The bevel of the inner surface 117 of portion 116 continues nearly to the leading edge of shoe 107' at 118, as shown only in FIG. 16. A thin wall 119, forming a lowermost portion of the inside of shoe 107' is notched at 120 and 121, as shown in FIG. 16. See FIG. 17 also. A passage for a yarn is provided between the beveled inner surface 117 of portion 116 and the wall 119 and this passage extends nearly to the leading end of shoe 107' at 118.

As shown in FIGS. 12a–12f, 13a–13f, and 15, a wire yarn guide 122 is fixed to the round surface of the turntable 14 by means of a cap screw 123 between each feed 17' and 18. The guide 122 will be seen to be much closer to feed 17' than the leading feed 18. It will be understood that a like guide 122 is provided between each feed 17' and 18 of the machine. The shape of the guide 122 is irregular, and is best understood from the drawing, particularly in FIG. 15. The guide 122 is preferably fairly rigid. The left hand end of the guide (FIGS. 13a–13b) is bent to form a somewhat square U-shape, having, however, rounded corners. The end portion of the wire constituting the guide, rises approximately vertically, as shown in the elevational figures, 13a–13f and 15 and identified by the numeral 125 in FIG. 15.

FIGS. 12a–12f and 13a–13f are illustrative of successive stages of a complete cycle of knitting pattern changes. The cycle starts with FIGS. 12a (plan view) and 13a (corresponding elevational view), and these figures also illustrate the end of a complete cycle.

In FIGS. 12a and 13a, the machine is producing plain knitted tubular fabric, and feed 18 is in lowered position.

In FIGS. 12b and 13b, the first of which shows the shifting mechanism 52, feed 18 has just been adjusted to raised position. Note in both figures that yarn 20 is attached to the last needle to the left of a blank space in which all dial and cylinder needles have been removed. This blank space is substantially the arcuate distance between any two feeds (see FIGS. 12f and 13f).

In FIGS. 12c and 13c the yarn 20 is beneath the guide 122 and is just about to be collected by feed 17'. Feed 18 is still in raised position.

In FIGS. 12d and 13d the yarn 20 has snapped above the U-shaped left hand end 124 of guide 122, and is in contact with end portion 125 of guide 122. Feed 18 is still in raised position. Yarn 20 has now been firmly collected by feed 17'. See FIGS. 16 and 17.

In FIGS. 12e and 13e the yarn 20 is being fed with yarn 19 by feed 17', and the product of the machine is rib knitted tubular fabric. Feed 18 is now in lowered position, and yarn 20 is still in the same position with respect to the left hand end of guide 122 as in FIGS. 12d and 13d. Note in FIG. 12e that pin 51a is pressing yarn 20 into position to be engaged by the needles in normal manner.

In FIGS. 12f and 13f feed 18 is in lowered position, and the cycle is nearly over. Yarn 20 is being pulled off the U-shaped end 124 of guide 122, and it will presently be in the position illustrated in FIGS. 12a and 13a.

Referring to FIGS. 13a–13f, 14 and 15, there is secured to the feed by means of a nut 49 (see FIGS. 14 and 15) and extending more or less downwardly therefrom, is a rigid pin 51a. The pin 51a assists in guiding the yarn 20 back toward the needles nearest the feed 18 when the feed 18 is moved from the position shown in FIG. 13d to the position shown in FIG. 13e.

It will be immediately apparent to those versed in the art that the invention is no more limited to the illustrated embodiment than it is to a circular knitting machine having stationary banks of needles and moving feeds. For example, were the banks moving and the feeds stationary, feeds 18, instead of being actuated by a stationary mechanism such as 52, could easily be actuated by a rotating cam arrangement. And, of course, the invention is in no way limited by the type of multi-feed knitting machine.

The present application is a continuation-in-part of application Serial No. 558,147, filed January 9, 1956, the latter being a continuation-in-part of application Serial No. 504,467, filed April 28, 1955, and allowed March 29, 1956, both of these now being abandoned in favor of the present application.

I claim:

1. A knitting machine comprising at least one needle bank and a plurality of yarn feeds, said yarn feeds being aligned in a path parallel to said needle bank, [means to relatively move] said yarn feeds and needle bank *being movable* past one another with said yarn feeds being juxtaposed with respect to said bank of needles so that the yarn supplied by each feed is normally positioned for engagement by the needles of said needle bank which are nearest thereto, some of said yarn feeds being displaceable away from the said normal position into a position in which the needles nearest the yarn feeds cannot engage the yarn supplied thereby, means to displace said displaceable yarn feeds into the said displaced position, means immediately behind yarn feeds which have been displaced, with respect to said relative motion, for engaging the yarn supplied by said displaced yarn feeds and guiding said last named yarn adjacent the yarn normally supplied by the normally positioned yarn feeds immediately behind said displaced yarn feeds whereby the needles nearest said yarn feeds immediately behind said displaced yarn feeds will simultaneously receive yarns supplied by adjacent yarn feeds so that displacement of said displaceable yarn feeds will alter the knitting pattern which will be produced.

2. A knitting machine as recited in claim 1 in which said engaging and guiding means is integral with said yarn feeds immediately behind the yarn feeds which have been displaced.

3. A knitting machine as recited in claim 1 in which alternate yarn feeds are displaceable and the remaining yarn feeds are not displaceable.

4. A knitting machine as recited in claim 1 in which said yarn feeds which are displaced are mounted for pivotal movement between two stable positions and are provided with a projecting finger fixed thereto and means are provided to deflect said finger whereby said yarn feeds which are displaced may be pivoted from one stable position to the other.

5. A knitting machine comprising parallel needle banks and a plurality of yarn feeds, said yarn feeds being aligned in a path parallel to said needle banks, [means to relatively move] said yarn feeds and needle banks *being movable* past one another with said yarn feeds being juxtaposed with respect to said banks of needles so that the yarn supplied by each feed is normally positioned for engagement by the needles of said needle banks which are nearest thereto, non-adjacent yarn feeds being displaceable away from the said normal position into a position in which the needles nearest the yarn feeds cannot engage the yarn supplied thereby, means to displace said displaceable yarn feeds into the said displaced position, the yarn feeds immediately behind yarn feeds which have been displaced, with respect to said relative motion, being provided with guide means for engaging the yarn supplied by said displaced yarn feeds, and guiding said last named yarn adjacent the yarn normally supplied by the normally positioned yarn feeds immediately behind said displaced yarn feeds whereby the needles nearest said yarn feeds immediately behind said displaced yarn feeds will simultaneously receive yarns supplied by adjacent yarn feeds so that one knitting pattern will be produced when the yarn supplied by each feed is engaged by the needles nearest thereto and another knitting pattern, including all of the yarns normally supplied, is produced when some of said yarn feeds are displaced as aforesaid.

6. A knitting machine as recited in claim 5 in which alternate yarn feeds are displaceable and the remaining yarn feeds are not displaceable.

7. A knitting machine as recited in claim 5 in which means are provided to return said displaced yarn feeds to their said normal position whereby said first named knitting pattern is again produced.

8. A knitting machine as recited in claim 7 in which said means to displace some of said yarn feeds and said means to return said displaced yarn feeds to their said normal position are stationary with respect to said needle banks.

9. A knitting machine as recited in claim 8 in which said displacing means and returning means are constituted by cams.

10. A knitting machine for the production of tubular fabric comprising continuous needle banks and a bank of yarn feeds positioned concentrically with respect thereto, [means to continuously relatively move] said bank of yarn feeds and said needle banks *being movable* past one another in opposite directions with said yarn feeds of said bank of yarn feeds being juxtaposed with respect to said banks of needles so that the yarn supplied by each feed is normally positioned for engagement by the needles of said needle banks which are nearest thereto, some of said yarn feeds being displaceable away from the said normal position into a position in which the needles nearest the yarn feeds cannot engage the yarn supplied thereby, means to displace said displaceable yarn feeds into the said displaced position, means immediately behind yarn feeds which have been displaced, with respect to said relative motion, for engaging the yarn supplied by said displaced yarn feeds, and guiding said last named yarn adjacent the yarn normally supplied by the normally positioned yarn feeds immediately behind said displaced yarn feeds whereby the needles nearest said yarn feeds immediately behind said displaced yarn feeds will simultaneously receive yarns supplied by adjacent yarn feeds so that one knitting pattern will be produced when the yarn supplied by each feed is engaged by the needles nearest thereto and another knitting pattern, including all of the yarns normally supplied, is produced when some yarn feeds are displaced as aforesaid.

11. A knitting machine as recited in claim 10 in which said bank of yarn feeds surrounds said continuous needle banks and said yarn feeds which are displaceable are pivotable outwardly into a position in which the needles nearest the yarn feeds which have been displaced cannot engage the yarn supplied thereby.

12. A circular knitting machine comprising a plurality of circular needle banks and a circular bank of yarn feeds concentrically surrounding the same, [means to continuously relatively rotate] said yarn feeds and needle banks *being rotatable* past one another in opposite directions with said yarn feeds of said bank of yarn feeds being juxtaposed with respect to said banks of needles so that the yarn supplied by each feed is normally positioned for engagement by the needles of said needle banks which are nearest thereto, non-adjacent yarn feeds being displaceable away from the said normal position into a position in which the needles nearest the yarn feeds cannot engage the yarn supplied thereby, means to displace said displaceable yarn feeds into the said displaced position, the yarn feeds immediately behind said displaced yarn feeds, with respect to said relative motion, being provided with guide means for engaging the yarn supplied by said displaced yarn feeds, and guiding said last named yarn adjacent the yarn normally supplied by the normally positioned yarn feeds immediately behind said displaced yarn feeds whereby the needles nearest said yarn feeds immediately behind said displaced yarn feeds will simultaneously receive yarns supplied by adjacent yarn feeds so that one knitting pattern will be produced when the yarn supplied by each feed is engaged by the needles nearest thereto and another knitting pattern, including all of the yarns normally supplied, is produced when some of said yarn feeds are displaced as aforesaid.

13. A knitting machine as recited in claim 12 in which said yarn feeds which are displaceable are pivotable outwardly into a position in which the needles nearest the yarn feeds which have been displaced cannot engage the yarn supplied thereby and said guide means on said yarn feeds immediately behind said displaced yarn feeds include a notch on the inner leading edge thereof.

14. A knitting machine as recited in claim 13 in which said yarn feeds immediately behind said yarn feeds which have been displaced are provided with a groove communicating between said notch and a position closely adjacent the yarn normally supplied thereby.

15. A knitting machine as recited in claim 12 in which said circular needle banks are constituted by a stationary bank of cylinder needles and a stationary bank of cooperating dial needles.

16. A knitting machine as recited in claim 12 in which said displaceable yarn feeds are mounted for pivotable movement about a horizontal axis and include a finger integral with and projecting from each of said displaceable yarn feeds, and finger control means stationary with respect to said needle banks.

17. A knitting machine as recited in claim 16 in which said finger control means includes a system of pivotably linked levers pivotably mounted upon a post, said system including a bottom lever and a top lever, said bottom lever being angularly disposed upwardly when said finger control means is in position to deflect said fingers upwardly and said top lever being angularly disposed downwardly when said finger control means is in position to deflect said fingers downwardly.

18. A knitting machine as recited in claim 17 in which said top and bottom levers are pivotally linked together by a cross link and spring means maintain said levers in position for downward deflection of said fingers, said system of levers being shiftable to deflect said fingers upwardly upon the application of a pivoting force to one of said levers.

19. A knitting machine as recited in claim 18 in which said pivoting force applied to one of said levers is automatically applied by means including a rocker arm having a follower mounted at one end thereof and bearing against a driven chain having normal and built up links.

20. In the operation of a knitting machine comprising at least one needle bank and a plurality of yarn feeds, said yarn feeds being aligned in a path parallel to said needle bank, said needle bank and said plurality of yarn feeds being moved relatively past one another with said yarn feeds being juxtaposed with respect to said needle bank so that the yarn supplied by each feed is normally engaged by the needles of the needle bank which are nearest thereto, the method of cyclically changing the pattern of knitting which comprises displacing some of said yarn feeds so that the yarn supplied thereby is shifted to a position in which the needle nearest the yarn feeds which have been displaced cannot engage the yarn supplied thereby and transferring the so shifted yarn to a next trailing yarn feed for delivery thereby to the needles of said needle bank which are nearest to the same, and then returning said displaced yarn feeds to their original position in which the yarn supplied thereby is once again engaged by the needles nearest thereto.

21. In the operation of a knitting machine comprising at least one needle bank and a plurality of yarn feeds, said yarn feeds being aligned in a path parallel to said needle bank, said needle bank and said plurality of yarn feeds being moved relatively past one another with said yarn feeds being juxtaposed with respect to said needle bank so that the yarn supplied by each feed is normally engaged by the needles of the needle bank which are nearest thereto, the method of changing the pattern of knitting in cycles which comprises displacing some of said yarn feeds so that the yarn supplied thereby is shifted to a position in which the needles nearest the yarn feeds which have been displaced cannot engage the yarn supplied thereby, guiding the yarn supplied by said displaced yarn feeds to a point adjacent the yarn supplied by the yarn feeds immediately behind said displaced yarn feeds whereby the needles nearest the yarn feeds immediately behind said displaced yarn feeds will be simultaneously supplied with an increased number of yarns, and then returning said displaced yarns feeds to their original position in which the yarn supplied thereby is once again engaged by the needles nearest thereto.

22. A knitting machine comprising at least one needle bank and a plurality of yarn feeds, said yarn feeds being aligned in a path parallel to said needle bank, [means to relatively move] said yarn feeds and needle bank *being movable* past one another with said yarn feeds being juxtaposed with respect to said bank of needles so that the yarn supplied by each feed is normally positioned for engagement by the needles of said needle bank which are nearest thereto, some of said yarn feeds being displaceable away from the said normal position into a position in which the needles nearest the yarn feeds cannot engage the yarn supplied thereby, means to displace said displaceable yarn feeds into the said displaced position, means immediately behind yarn feeds which have been displaced, with respect to said relative motion, for engaging the yarn supplied by said displaced yarn feeds and guiding said last named yarn adjacent the yarn normally supplied by the normally positioned yarn feeds immediately behind said displaced yarn feeds whereby the needles nearest said yarn feeds immediately behind said displaced yarn feeds will simultaneously receive yarns supplied by adjacent yarn feeds so that displacement of said displaceable yarn feeds will alter the knitting pattern which will be produced, said means for engaging and guiding the yarn supplied by said displaced yarn feeds including intermediate yarn guides positioned between said displaced yarn feeds and the yarn feeds immediately therebehind.

23. A knitting machine as recited in claim 22 in which said intermediate yarn guides are stationary with respect to said yarn feeds and are positioned closer to said yarn feeds immediately behind said displaceable yarn feeds than to said displaced yarn feeds.

24. A knitting machine as recited in claim 22 in which said intermediate yarn guides are constituted by a wire having a U-shaped portion, the base of which extends away from said displaceable yarn feeds, said wire terminating in an approximately vertical portion rising from the free end of the top leg of said U-shaped portion.

25. A knitting machine as recited in claim 22 in which said displaceable yarn feeds are provided with a yarn deflector for moving the yarn toward said bank of needles when then displaced yarn feeds are returned to their normal position.

26. A knitting machine comprising at least one needle bank and a plurality of yarn feeds, said yarn feeds being aligned in a path parallel to said needle bank, [means to relatively move] said yarn feeds and needle bank *being movable* past one another with said yarn feeds being juxtaposed with respect to said bank of needles so that the yarn supplied by each feed is normally positioned for engagement by the needles of said needle bank which are nearest thereto, some of said yarn feeds being displaceable away from the said normal position into a position in which the needles nearest the yarn feeds cannot engage the yarn supplied thereby, means to displace said displaceable yarn feeds into the said displaced position, means immediately behind yarn feeds which have been displaced, with respect to said relative motion, for engaging the yarn supplied by said displaced yarn feeds and guiding said last named yarn adjacent the yarn normally supplied by the normally positioned yarn feeds immediately behind said displaced yarn feeds whereby the needles nearest said yarn feeds immediately behind said displaced yarn feeds will simultaneously receive yarns supplied by adjacent yarn feeds so that displacement of said displaceable yarn feeds will alter the knitting pattern which will be produced, said yarn feeds immediately behind said displaced yarn feeds being provided with a shoe having a wedge-shaped slot facing said needle bank and extending from near the leading edge to the trailing edge thereof, the lower portion of said shoe communicating with said slot being bent outwardly away from said needle bank.

27. A knitting machine as recited in claim 26 in which the surface of said outwardly bent lower portion of said shoe facing said needle bank is beveled and the lowermost portion of said shoe facing said needle bank is formed with a downwardly depending wall to thereby form a passage for yarn supplied by said displaced yarn feeds between said beveled surface and said wall.

28. A knitting machine as recited in claim 27 in which an intermediate yarn guide is positioned between each displaceable yarn feed and the yarn feed immediately therebehind.

References Cited in the file of this patent or the original patent

UNITED STATES PATENTS

| | | |
|---|---|---|
| 645,676 | Wilcomb | Mar. 20, 1900 |
| 836,058 | Vaughan | Nov. 13, 1906 |
| 925,393 | Scott | June 15, 1909 |
| 1,850,393 | Henne et al. | Mar. 22, 1932 |
| 1,883,337 | Collar | Oct. 18, 1932 |
| 2,549,701 | Mishcon et al. | Apr. 17, 1951 |